US012759273B2

(12) United States Patent
Fukushima et al.

(10) Patent No.: US 12,759,273 B2
(45) Date of Patent: Oct. 13, 2026

(54) HARDCOAT FILM AND ARTICLE AND IMAGE DISPLAY DEVICE HAVING HARDCOAT FILM

(71) Applicant: FUJIFILM Corporation, Tokyo (JP)

(72) Inventors: Yuta Fukushima, Kanagawa (JP); Ayako Matsumoto, Kanagawa (JP); Tetsu Kitamura, Kanagawa (JP); Akio Tamura, Kanagawa (JP); Keigo Ueki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 849 days.

(21) Appl. No.: 17/038,890

(22) Filed: Sep. 30, 2020

(65) Prior Publication Data

US 2021/0023827 A1 Jan. 28, 2021

Related U.S. Application Data

(63) Continuation of application No. PCT/JP2019/008313, filed on Mar. 4, 2019.

(30) Foreign Application Priority Data

Apr. 26, 2018 (JP) ................................ 2018-085776
May 31, 2018 (JP) ................................ 2018-105433
Nov. 27, 2018 (JP) ................................ 2018-221738

(51) Int. Cl.

*B32B 27/08* (2006.01)
*B32B 27/28* (2006.01)
*B32B 27/30* (2006.01)
*B32B 27/38* (2006.01)
*G02B 1/14* (2015.01)

(52) U.S. Cl.

CPC ............ *B32B 27/08* (2013.01); *B32B 27/283* (2013.01); *B32B 27/308* (2013.01); *B32B 27/38* (2013.01); *G02B 1/14* (2015.01); *B32B 2250/02* (2013.01); *B32B 2250/24* (2013.01); *B32B 2307/536* (2013.01); *B32B 2307/584* (2013.01); *B32B 2551/00* (2013.01); *B32B 2571/00* (2013.01)

(58) Field of Classification Search

CPC ..... B32B 27/08; B32B 27/283; B32B 27/308; B32B 27/38; B32B 2250/02; B32B 2250/24; B32B 2307/536; B32B 2307/584; B32B 2551/00; B32B 2571/00; G02B 1/14

See application file for complete search history.

(56) References Cited

U.S. PATENT DOCUMENTS

| | | | | |
|---|---|---|---|---|
| 5,231,524 | A * | 7/1993 | De Keyzer | G02F 1/133345 349/122 |
| 2010/0029804 | A1* | 2/2010 | Nakayama | C08G 18/3876 522/172 |
| 2013/0083273 | A1* | 4/2013 | Fukuda | G02B 1/14 349/193 |
| 2016/0046830 | A1 | 2/2016 | Kim et al. | |
| 2016/0186009 | A1* | 6/2016 | Goto | H10K 50/15 257/40 |
| 2016/0297933 | A1* | 10/2016 | Kuwana | B32B 7/12 |
| 2018/0230316 | A1* | 8/2018 | Kim | C09D 5/006 |
| 2018/0231692 | A1 | 8/2018 | Ham et al. | |
| 2019/0292342 | A1* | 9/2019 | Kikuchi | C08J 7/046 |

FOREIGN PATENT DOCUMENTS

| | | | |
|---|---|---|---|
| CN | 106459370 | A | 2/2017 |
| JP | 2004-004612 | A | 1/2004 |
| JP | 2012-220556 | A | 11/2012 |
| JP | 2014-215954 | A | 11/2014 |
| JP | 2015-212353 | A | 11/2015 |
| JP | 2016-160342 | A | 9/2016 |
| JP | 2018-177952 | A | 11/2018 |
| KR | 10-2017-0106923 | A | 9/2017 |
| WO | 2018/212051 | A1 | 11/2018 |

OTHER PUBLICATIONS

Office Action, issued by the State Intellectual Property Office on Oct. 25, 2022, in connection with Chinese Patent Application No. 201980025500.1.
Office Action, issued by the State Intellectual Property Office on Feb. 15, 2022, in connection with Chinese Patent Application No. 201980025500.1.
International Search Report Issued in PCT/JP2019/008313 on Jun. 4, 2019.
Written Opinion Issued in PCT/JP2019/008313 on Jun. 4, 2019.
International Preliminary Report on Patentability Issued in PCT/JP2019/008313 on Oct. 27, 2020.
Office Action which was issued by the State Intellectual Property Office of China on Mar. 6, 2026, in connection with Chinese Patent Application No. 201980025500.1.
Office Action which was issued by the State Intellectual Property Office of China on Jan. 4, 2026, in connection with Chinese Patent Application No. 201980025500.1.

* cited by examiner

*Primary Examiner* — Callie E Shosho
*Assistant Examiner* — Bethany M Miller
(74) *Attorney, Agent, or Firm* — Edwards Neils LLC; Jean C. Edwards, Esq.

(57) ABSTRACT

A hardcoat film has a substrate, a hardcoat layer, and a mixed layer in this order. The hardcoat layer contains a cured product of polyorganosilsesquioxane (a1) having an epoxy group. The mixed layer contains a cured product of a compound (b1) having an epoxy group and a cured product of a compound (b2) having two or more (meth)acryloyl groups in one molecule.

12 Claims, No Drawings

HARDCOAT FILM AND ARTICLE AND IMAGE DISPLAY DEVICE HAVING HARDCOAT FILM

CROSS-REFERENCE TO RELATED APPLICATIONS

This application is a Continuation of PCT International Application No. PCT/JP2019/008313 filed on Mar. 4, 2019, which was published under PCT Article 21(2) in Japanese, and which claims priority under 35 U.S.C § 119(a) to Japanese Patent Application No. 2018-085776 filed on Apr. 26, 2018, Japanese Patent Application No. 2018-105433 filed on May 31, 2018, and Japanese Patent Application No. 2018-221738 filed on Nov. 27, 2018. The above applications are hereby expressly incorporated by reference, in their entirety, into the present application.

BACKGROUND OF THE INVENTION

1. Field of the Invention

The present invention relates to a hardcoat film and an article and an image display device that have the hardcoat film.

2. Description of the Related Art

For image display devices such as a display device using a cathode ray tube (CRT), a plasma display panel (PDP), an electroluminescence display (ELD), a vacuum fluorescent display (VFD), a field emission display (FED), and a liquid crystal display (LCD), in order to prevent the display surface from being scratched, it is preferable to provide an optical film (hardcoat film) having a hardcoat layer on a substrate.

For example, JP2016-160342A describes a film comprising a hardcoat layer which is on a substrate and formed of a curable composition containing polyorganosilsesquioxane having an epoxy group and a compound having two or more (meth)acryloyl groups in one molecule.

Furthermore, JP2012-220556A describes a film having a layer of high refractive index and a layer of low refractive index that are on a glass substrate, in which the layer of high refractive index is formed of a cured product of a composition containing polyorganosiloxane, metal oxide particles, and a polyfunctional (meth)acrylate compound.

SUMMARY OF THE INVENTION

In recent years, for example, for smartphones and the like, there has been an increasing need for flexible displays. Accordingly, there has been a demand for an optical film that is hardly broken even being repeatedly folded (an optical film having excellent resistance to repeated folding). Particularly, there has been a strong demand for an optical film that can simultaneously satisfy hardness, scratch resistance, and resistance to repeated folding.

As a result of examination, the inventors of the present invention have found that the films described in JP2016-160342A and JP2012-220556A cannot simultaneously satisfy hardness, scratch resistance, and resistance to repeated folding.

An object of the present invention is to provide a hardcoat film having excellent scratch resistance, high hardness, and excellent resistance to repeated folding and to provide an article and an image display device comprising the hardcoat film.

As a result of intensive examination, the inventors of the present invention have found that the above object can be achieved by the following means.

<1>

A hardcoat film having a substrate; a hardcoat layer; and a mixed layer in this order, in which the hardcoat layer contains a cured product of polyorganosilsesquioxane (a1) having an epoxy group, and the mixed layer contains a cured product of a compound (b1) having an epoxy group and a cured product of a compound (b2) having two or more (meth)acryloyl groups in one molecule.

<2>

The hardcoat film described in <1>, in which a thickness of the mixed layer is 0.05 μm to 10 μm.

<3>

The hardcoat film described in <1> or <2>, further having an anti-scratch layer on one surface of the mixed layer that is opposite to the other surface of the mixed layer coming into contact with the hardcoat layer, in which the anti-scratch layer contains a cured product of a compound (c1) having two or more (meth)acryloyl groups in one molecule.

<4>

The hardcoat film described in <3>, in which a total thickness of the mixed layer and the anti-scratch layer is 0.1 μm to 10 μm.

<5>

The hardcoat film described in any one of <1> to <4>, in which the polyorganosilsesquioxane (a1) having an epoxy group is polyorganosilsesquioxane having an alicyclic epoxy group.

<6>

The hardcoat film described in any one of <1> to <5>, in which the compound (b1) having an epoxy group is polyorganosilsesquioxane having an epoxy group.

<7>

The hardcoat film described in <6>, in which the compound (b1) having an epoxy group is polyorganosilsesquioxane having an alicyclic epoxy group.

<8>

The hardcoat film described in any one of <1> to <7>, in which in the mixed layer, a content rate of the cured product of the compound (b2) having two or more (meth)acryloyl groups in one molecule is equal to or higher than 10% by mass with respect to a total amount of the cured product of the compound (b1) having an epoxy group and the cured product of the compound (b2) having two or more (meth) acryloyl groups in one molecule.

<9>

The hardcoat film described in any one of <1> to <8>, in which the hardcoat layer does not contain a cured product of a compound having a (meth)acryoyl group, or a content rate of the cured product of a compound having a (meth)acryloyl group is less than 10% by mass with respect to a total amount of the cured product of the polyorganosilsesquioxane (a1) having an epoxy group and the cured product of the compound having a (meth)acryloyl group.

<10>

The hardcoat film described in any one of <1> to <9>, in which the substrate contains an imide-based polymer.

<11>

An article comprising the hardcoat film described in any one of <1> to <10>.

<12>

An image display device comprising the hardcoat film described in any one of <1> to <10> as a surface protection film.

According to an aspect of the present invention, it is possible to provide a hardcoat film having excellent scratch resistance, high hardness, and excellent resistance to repeated folding and to provide an article and an image display device comprising the hardcoat film.

DESCRIPTION OF THE PREFERRED EMBODIMENTS

Hereinafter, embodiments of the present invention will be specifically described, but the present invention is not limited thereto. In the present specification, in a case where numerical values represent a value of physical properties, a value of characteristics, and the like, the description of "(numerical value 1) to (numerical value 2)" means "equal to or greater than (numerical value 1) and equal to or smaller than (numerical value 2)". In addition, in the present specification, the description of "(meth)acrylate" means "at least one of acrylate or methacrylate". The same shall be applied to "(meth)acrylic acid". "(meth)acryloyl", and the like.

[Hardcoat Film]

The hardcoat film according to an embodiment of the present invention is a hardcoat film having a substrate, a hardcoat layer, and a mixed layer in this order, in which the hardcoat layer contains a cured product of polyorganosilsesquioxane (a1) having an epoxy group, and the mixed layer contains a cured product of a compound (b1) having an epoxy group and a cured product of a compound (b2) having two or more (meth)acryloyl groups in one molecule.

The hardcoat film according to an embodiment of the present invention has excellent scratch resistance, high hardness, and excellent resistance to repeated folding. The mechanism that allows the hardcoat film to have the above properties unclear, but is assumed to be as below according to the inventors of the present invention.

The hardcoat layer of the hardcoat film according to the embodiment of the present invention contains a cured product of polyorganosilsesquioxane (a1) having an epoxy group. The cured product of (a1) has an organic crosslinked network composed of inorganic structures (structures formed by siloxane bonds) formed by a polymerization reaction of epoxy groups. Presumably, as a result, the deformation recovery of the hardcoat film according to the embodiment of the present invention may be improved, and hence the hardcoat film may exhibit high pencil hardness.

Furthermore, presumably, because the hardcoat layer contains the cured product of (a1), the modulus of elasticity of the hardcoat layer may not excessively increase, and the hardcoat layer could maintain appropriate flexibility. It is considered that consequently, the hardcoat film also has excellent resistance to repeated folding.

In addition, the hardcoat film according to the embodiment of the present invention has a mixed layer that contains a cured product of a compound (b1) having an epoxy group and a cured product of a compound (b2) having two or more (meth)acryloyl groups in one molecule. Presumably, as a result, the cured product of (b1) and the cured product of (b2) may be interlaced with each other in the hardcoat film according to the embodiment of the present invention and form an interpenetrating polymer network (IPN) structure. It is considered that due to the structure, the hardcoat film may exhibit excellent scratch resistance. Moreover, presumably, in a case where one surface of the mixed layer opposite to the other surface thereof coming into contact with the hardcoat layer is provided with an anti-scratch layer containing a cured product of a compound (c1) having two or more (meth)acryloyl groups in one molecule, the mixed layer could form a covalent bond with both the hardcoat layer and the anti-scratch layer. It is considered that accordingly, these layers may excellently adhere to one another, and excellent scratch resistance may be exhibited.

<Substrate>

The substrate of the hardcoat film according to the embodiment of the present invention will be described.

The transmittance of the substrate in a visible light region is preferably equal to or higher than 70%, more preferably equal to or higher than 80%, and even more preferably equal to or higher than 90%. The substrate preferably contains a polymer.

(Polymer)

As the polymer, a polymer excellent in optical transparency, mechanical strength, heat stability, and the like is preferable.

Examples of such a polymer include polycarbonate-based polymers, polyester-based polymers such as polyethylene terephthalate (PET) and polyethylene naphthalate (PEN), styrene-based polymers such as polystyrene and an acrylonitrilestyrene copolymer (AS resin), and the like. The examples also include polyolefins such as polyethylene and polypropylene, norbornene-based resins, polyolefin-based polymers such as ethylene/propylene copolymers, (meth) acrylic polymers such as polymethyl methacrylate, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy-based polymers, cellulose-based polymers represented by triacetyl cellulose, copolymers of the above polymers, and polymers obtained by mixing together the above polymers.

Particularly, amide-based polymers such as aromatic polyamide and imide-based polymers can be preferably used as the substrate, because the number of times of folding at break measured for these polymers by an MIT tester according to Japanese Industrial Standards (JIS) P8115 (2001) is large, and these polymers have relatively high hardness. For example, the aromatic polyamide described in Example 1 of JP5699454B and the polyimides described in JP2015-508345A, JP2016-521216A, and WO2017/014287A can be preferably used as the substrate.

The substrate can also be formed as a cured layer of an ultraviolet curable resin or a thermosetting resin based on acryl, urethane, acrylic urethane, epoxy, silicone, and the like.

(Softening Material)

The substrate may contain a material that further softens the polymer described above. The softening material refers to a compound that improves the number of times of folding at break. As the softening material, it is possible to use a rubber elastic material, a brittleness improver, a plasticizer, a slide ring polymer, and the like.

Specifically, as the softening material, the softening materials described in paragraphs "0051" to "0114" of JP2016-167043A can be suitability used.

The softening material may be mixed alone with the polymer, or a plurality of softening materials may be appropriately used in combination. Furthermore, the substrate may be prepared using one kind of softening material or a plurality of softening materials without being mixed with the polymer.

That is, the amount of the softening material to be mixed is not particularly limited. A polymer having the sufficient number of times of folding at break itself may be used alone as the substrate of the film or may be mixed with the softening material, or the substrate may be totally (100%) composed of the softening material such that the number of times of folding at break becomes sufficient.

(Other Additives)

Various additives (for example, an ultraviolet absorber, a matting agent, an antioxidant, a peeling accelerator, a retardation (optical anisotropy) regulator, and the like) can be added to the substrate according to the use. These additives may be solids or oily substances. That is, the melting point or boiling point thereof is not particularly limited. In addition, the additives may be added at any point in time in the step of preparing the substrate, and a step of preparing a material by adding additives may be added to a material preparation step. Furthermore, the amount of each material added is not particularly limited as long as each material performs its function.

As those other additives, the additives described in paragraphs "0117" to "0122" of JP2016-167043A can be suitably used.

One kind of each of the above additives may be used singly, or two or more kinds of the above additives can be used in combination.

(Ultraviolet Absorber)

Examples of the ultraviolet absorber include a benzotriazole compound, a triazine compound, and a benzoxazine compound. The benzotriazole compound is a compound having a benzotriazole ring, and specific examples thereof include various benzotriazole-based ultraviolet absorbers described in paragraph "0033" of JP2013-111835A. The triazine compound is a compound having a triazine ring, and specific examples thereof include various triazine-based ultraviolet absorbers described in paragraph "0033" of JP2013-111835A. As the benzoxazine compound, for example, those described in paragraph "0031" of JP2014-209162A can be used. The content of the ultraviolet absorber in the substrate is, for example, about 0.1 to 10 parts by mass with respect to 100 parts by mass of the polymer contained in the substrate, but is not particularly limited. Regarding the ultraviolet absorber, paragraph "0032" of JP2013-111835A can also be referred to. In the present invention, an ultraviolet absorber having high heat resistance and low volatility is preferable. Examples of such an ultraviolet absorber include UVSORB101 (manufactured by FUJIFILM Finechemicals Co., Ltd.). TINUVIN 360, TINUVIN 460, and TINUVIN 1577 (manufactured by BASF SE), LA-F70, LA-31, and LA-46 (manufactured by ADEKA CORPORATION), and the like.

From the viewpoint of transparency, it is preferable that the difference between a refractive index of the softening material and various additives used in the substrate and a refractive index of the polymer is small.

(Substrate Containing Imide-Based Polymer)

As the substrate, a substrate containing an imide-based polymer can be preferably used. In the present specification, the imide-based polymer means a polymer containing at least one or more kinds of repeating structural units represented by Formula (PI), Formula (a), Formula (a'), and Formula (b). Particularly, from the viewpoint of hardness and transparency of the film, it is preferable that the repeating structural unit represented by Formula (PI) is the main structural unit of the imide-based polymer. The amount of the repeating structural unit represented by Formula (PI) with respect to the total amount of the repeating structural units in the imide-based polymer is preferably equal to or greater than 40 mol %, more preferably equal to or greater than 50 mol %, even more preferably equal to or greater than 70 mol %, still more preferably equal to or greater than 90 mol %, and yet more preferably equal to or greater than 98 mol %.

(PI)

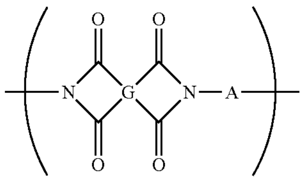

(a)

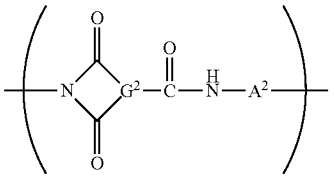

(a')

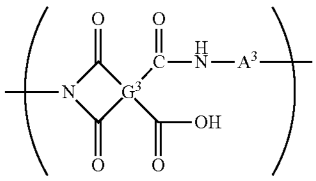

(b)

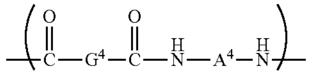

In Formula (PI), G represents a tetravalent organic group, and A represents a divalent organic group. In Formula (a), $G^2$ represents a trivalent organic group, and $A^2$ represents a divalent organic group. In Formula (a'). $G^3$ represents a tetravalent organic group, and $A^3$ represents a divalent organic group. In Formula (b), $G^4$ and $A^4$ each represent a divalent organic group.

Examples of the organic group as the tetravalent organic group represented by G in Formula (PI) (hereinafter, sometimes referred to as organic group of G) include a group selected from the group consisting of an acyclic aliphatic group, a cyclic aliphatic group, and an aromatic group. From the viewpoint of transparency and flexibility of the substrate containing the imide-based polymer, the organic group of G is preferably a tetravalent cyclic aliphatic group or a tetravalent aromatic group. Examples of the aromatic group include a monocyclic aromatic group, a condensed polycyclic aromatic group, a non-condensed polycyclic aromatic group having two or more aromatic rings which are linked to each other directly or through a linking group, and the like. From the viewpoint of transparency and coloration inhibition of the resin film, the organic group of G is preferably a cyclic aliphatic group, a cyclic aliphatic group having a fluorine-based substituent, a monocyclic aromatic group having a fluorine-based substituent, a condensed polycyclic aromatic group having a fluorine-based substituent, or a non-condensed polycyclic aromatic group having a fluorine-based substituent. In the present specification, the fluorine-based substituent means a group containing a fluorine atom. The fluorine-based substituent is preferably a fluoro group (fluorine atom, —F) and a perfluoroalkyl group, and more preferably a fluoro group and a trifluoromethyl group.

More specifically, the organic group of G is selected, for example, from a saturated or unsaturated cycloalkyl group, a saturated or unsaturated heterocycloalkyl group, an aryl group, a heteroaryl group, an arylalkyl group, an alkylaryl group, a heteroalkylaryl group, and a group having any two groups (which may be the same as each other) among these that are linked to each other directly or through a linking group. Examples of the linking group include —O—, an alkylene group having 1 to 10 carbon atoms, $—SO_2—$, —CO—, and —CO—NR— (R represents an alkyl group having 1 to 3 carbon atoms such as a methyl group, an ethyl group, or a propyl group or a hydrogen atom).

The tetravalent organic group represented by G usually has 2 to 32 carbon atoms, preferably has 4 to 15 carbon atoms, more preferably has 5 to 10 carbon atoms, and even more preferably has 6 to 8 carbon atoms. In a case where the organic group of G is a cyclic aliphatic group or an aromatic group, at least one of the carbon atoms constituting these groups may be substituted with a hetero atom. Examples of the hetero atom include O, N, and S.

Specific examples of G include groups represented by the following Formula (20), Formula (21), Formula (22), Formula (23), Formula (24), formula (25), or Formula (26). * in each formula represents a bond. In Formula (26), Z represents a single bond, —O—, $—CH_2—$, $—C(CH_3)_2—$, —Ar—O—Ar—, $—Ar—CH_2—Ar—$, $—Ar—C(CH_3)_2—Ar—$, or $—Ar—SO_2—Ar—$. Ar represents an aryl group having 6 to 20 carbon atoms. Ar may be, for example, a phenylene group. At least one of the hydrogen atoms in these groups may be substituted with a fluorine-based substituent.

(20)

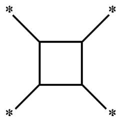

(21)

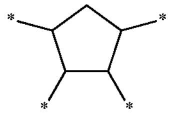

(22)

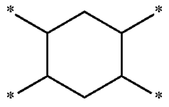

(23)

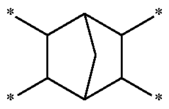

(24)

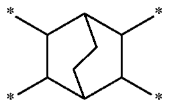

(25)

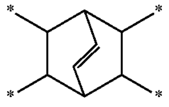

-continued (26)

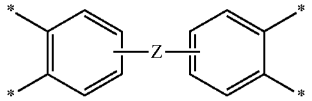

Examples of the organic group as the divalent organic group represented by A in Formula (PI) (hereinafter, sometimes referred to as organic group of A) include a group selected from the group consisting of an acyclic aliphatic group, a cyclic aliphatic group, and an aromatic group. The divalent organic group represented by A is preferably selected from a divalent cyclic aliphatic group and a divalent aromatic group Examples of the aromatic group include a monocyclic aromatic group, a condensed polycyclic aromatic group, and a non-condensed polycyclic aromatic group having two or more aromatic rings which are linked to each other directly or through a linking group. From the viewpoint of transparency and coloration inhibition of the resin film, it is preferable that a fluorine-based substituent is introduced into the organic group of A.

More specifically, examples of the organic group of A include a saturated or unsaturated cycloalkyl group, a saturated or unsaturated heterocycloalkyl group, an aryl group, a heteroaryl group, an arylalkyl group, an alkylaryl group, a heteroalkylaryl group, and a group having any two groups (which may be the same as each other) among these that are linked to each other directly or through a linking group. Examples of the hetero atom include O, N, and S Examples of the linking group include —O—, an alkylene group having 1 to 10 carbon atoms, $—SO_2—$, —CO—, and —CO—NR— (R represents an alkyl group having 1 to 3 carbon atoms such as a methyl group, an ethyl group, or a propyl group or a hydrogen atom).

The divalent organic group represented by A usually has 2 to 40 carbon atoms, preferably has 5 to 32 carbon atoms, more preferably has 12 to 28 carbon atoms, and even more preferably has 24 to 27 carbon atoms.

Specific examples of A include groups represented by the following Formula (30), Formula (31), Formula (32), Formula (33), or Formula (34). * in each formula represents a bond. $Z^1$ to $Z^3$ each independently represent a single bond —O—, —CH—, $—C(CH_3)_2—$, —SO—, —CO—, or —CO—NR— (R represents an alkyl group having 1 to 3 carbon atoms such as a methyl group, an ethyl group, or a propyl group or a hydrogen atom). In the following groups. $Z^1$ and $Z^2$ as well as $Z^2$ and $Z^3$ are preferably in the meta position or para position respectively for each ring. Furthermore, it is preferable that $Z^1$ and a terminal single bond, $Z^2$ and a terminal single bond, and $Z^3$ and a terminal single bond are in the meta position or para position respectively. For example, in A, $Z^1$ and $Z^3$ represent —O—, and $Z^2$ represents $—CH_2—$, $—C(CH_3)_2—$, or $—SO_2—$. One hydrogen atom or two or more hydrogen atoms in these groups may be substituted with a fluorine-based substituent.

(30)

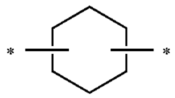

(31)

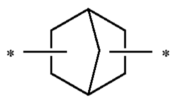

-continued (32)

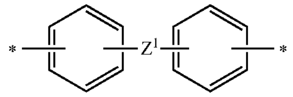

(33)

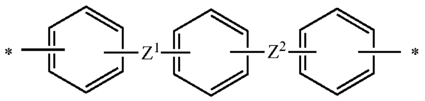

(34)

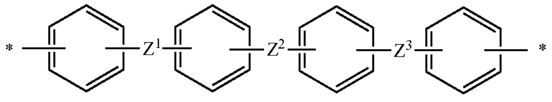

At least one of the hydrogen atoms constituting at least one of A or G may be substituted with at least one kind of functional group selected from the group consisting of a fluorine-based substituent, a hydroxyl group, a sulfone group, an alkyl group having 1 to 10 carbon atoms, and the like. Furthermore, in a case where each of the organic group of A and the organic group of G is a cyclic aliphatic group or an aromatic group, it is preferable that at least one of A or G has a fluorine-based substituent, and it is more preferable that both the A and G have a fluorine-based substituent.

$G^2$ in Formula (a) represents a trivalent organic group. This organic group can be selected from the same group as the organic group of G in formula (PI), except that $G^2$ is a trivalent group. Examples of $G^2$ include groups represented by Formula (20) to Formula (26) listed above as specific examples of G in which any one of the four bonds is substituted with a hydrogen atom. A2 in Formula (a) can be selected from the same group as A in Formula (PI).

$G^3$ in Formula (a') can be selected from the same group as Gin Formula (PI). $A^3$ in Formula (a') can be selected from the same group as A in Formula (PI).

$G^4$ in Formula (b) represents a divalent organic group. This organic group can be selected from the same group as the organic group of G in formula (PI), except that $G^4$ is a divalent group. Examples of $G^4$ include groups represented by Formula (20) to Formula (26) listed above as specific examples of G in which any two of the four bonds are substituted with a hydrogen atom. $A^4$ in Formula (b) can be selected from the same group as A in Formula (PI).

The imide-based polymer contained in the substrate containing the imide-based polymer may be a condensed polymer obtained by the polycondensation of diamines and at least one kind of tetracarboxylic acid compound (including a tetracarboxylic acid compound analog such as an acid chloride compound or a tetracarboxylic dianhydride) or one kind of tricarboxylic acid compound (including a tricarboxylic acid compound analog such as an acid chloride compound or a tricarboxylic anhydride). Furthermore, a dicarboxylic acid compound (including an analog such as an acid chloride compound) may also take part in the polycondensation. The repeating structural unit represented by Formula (PT) or Formula (a') is usually derived from diamines and a tetracarboxylic acid compound. The repeating structural unit represented by Formula (a) is usually derived from diamines and a tricarboxylic acid compound. The repeating structural unit represented by Formula (b) is usually derived from diamines and a dicarboxylic acid compound.

Examples of the tetracarboxylic acid compound include an aromatic tetracarboxylic acid compound, an alicyclic tetracarboxylic acid compound, an acyclic aliphatic tetracarboxylic acid compound, and the like. Two or more kinds of these compounds may be used in combination. The tetracarboxylic acid compound is preferably tetracarboxylic dianhydride. Examples of the tetracarboxylic dianhydride include an aromatic tetracarboxylic dianhydride, an alicyclic tetracarboxylic dianhydride, and an acyclic aliphatic tetracarboxylic dianhydride.

From the viewpoint of solubility of the imide-based polymer in a solvent and from the viewpoint of transparency and flexibility of the formed substrate, the tetracarboxylic acid compound is preferably an alicyclic tetracarboxylic acid compound, an aromatic tetracarboxylic acid compound, or the like. From the viewpoint of transparency and coloration inhibition of the substrate containing the imide-based polymer, the tetracarboxylic acid compound is preferably a compound selected from an alicyclic tetracarboxylic acid compound having a fluorine-based substituent and an aromatic tetracarboxylic acid compound having a fluorine-based substituent, and more preferably an alicyclic tetracarboxylic acid compound having a fluorine-based substituent.

Examples of the tricarboxylic acid compound include an aromatic tricarboxylic acid, an alicyclic tricarboxylic acid, an acyclic aliphatic tricarboxylic acid, an acid chloride compound or an acid anhydride that is structurally similar to these, and the like. The tricarboxylic acid compound is preferably selected from an aromatic tricarboxylic acid, an alicyclic tricarboxylic acid, an acyclic aliphatic tricarboxylic acid, and an acid chloride compound that is structurally similar to these. Two or more kinds of tricarboxylic acid compounds may be used in combination.

From the viewpoint of solubility of the imide-based polymer in a solvent and from the viewpoint of transparency and flexibility of the formed substrate containing the imide-based polymer, the tricarboxylic acid compound is preferably an alicyclic tricarboxylic acid compound or an aromatic tricarboxylic acid compound. From the viewpoint of transparency and coloration inhibition of the substrate containing the imide-based polymer, the tricarboxylic acid compound is more preferably an alicyclic tricarboxylic acid compound having a fluorine-based substituent or an aromatic tricarboxylic acid compound having a fluorine-based substituent.

Examples of the dicarboxylic acid compound include an aromatic dicarboxylic acid, an alicyclic dicarboxylic acid, an acyclic aliphatic dicarboxylic acid, an acid chloride compound or an acid anhydride that is structurally similar to these, and the like. The dicarboxylic acid compound is preferably selected from an aromatic dicarboxylic acid, an alicyclic dicarboxylic acid, an acyclic aliphatic dicarboxylic acid, and an acid chloride compound that is structurally similar to these. Two or more kinds of dicarboxylic acid compounds may be used in combination.

From the viewpoint of solubility of the imide-based polymer in a solvent and from the viewpoint of transparency and flexibility of the formed substrate containing the imide-based polymer, the dicarboxylic acid compound is preferably an alicyclic dicarboxylic acid compound or an aromatic dicarboxylic acid compound. From the viewpoint of transparency and coloration inhibition of the substrate containing the imide-based polymer, the dicarboxylic acid compound is more preferably an alicyclic dicarboxylic acid compound having a fluorine-based substituent or an aromatic dicarboxylic acid compound having a fluorine-based substituent.

Examples of the diamines include an aromatic diamine, an alicyclic diamine, and an aliphatic diamine. Two or more kinds of these may be used in combination. From the viewpoint of solubility of the imide-based polymer in a solvent and from the viewpoint of transparency and flexibility of the formed substrate containing the imide-based polymer, the diamines are preferably selected from an alicyclic diamine and an aromatic diamine having a fluorine-based substituent.

In a case where such an imide-based polymer is used, it is easy to obtain a resin film having particularly excellent flexibility, high light transmittance (for example, equal to or higher than 85% and preferably equal to or higher than 88% for light at 550 nm), low yellowness (YI value that is equal to or lower than 5 and preferably equal to or lower than 3), and low haze (equal to or lower than 1.5% and preferably equal to or lower than 1.0%).

The imide-based polymer may be a copolymer containing a plurality of different kinds of repeating structural units described above. The weight-average molecular weight of the polyimide-based polymer is generally 10,000 to 500.000. The weight-average molecular weight of the imide-based polymer is preferably 50,000 to 500,000, and more preferably 70,000 to 400,000. The weight-average molecular weight is a molecular weight measured by gel permeation chromatography (GPC) and expressed in terms of standard polystyrene. In a case where the weight-average molecular weight of the imide-based polymer is large, high flexibility tends to be easily obtained. However, in a case where the weight-average molecular weight of the imide-based polymer is too large, the viscosity of varnish increases, and hence workability tends to deteriorate.

The imide-based polymer may contain a halogen atom such as a fluorine atom which can be introduced into the polymer by the aforementioned fluorine-based substituent or the like. In a case where the polyimide-based polymer contains a halogen atom, the modulus of elasticity of the substrate containing the imide-based polymer can be improved, and the yellowness can be reduced. As a result, the occurrence of scratches, wrinkles, and the like in the resin film can be inhibited, and the transparency of the substrate containing the imide-based polymer can be improved. The halogen atom is preferably a fluorine atom. The content of the halogen atom in the polyimide-based polymer based on the mass of the polyimide-based polymer is preferably 1% to 40% by mass, and more preferably 1% to 30% by mass.

The substrate containing the imide-based polymer may contain one kind of ultraviolet absorber or two or more kinds of ultraviolet absorbers. The ultraviolet absorber can be appropriately selected from compounds that are generally used as ultraviolet absorbers in the field of resin materials. The ultraviolet absorber may include a compound that absorbs light having a wavelength equal to or shorter than 400 nm. Examples of the ultraviolet absorber that can be appropriately combined with the imide-based polymer include at least one kind of compound selected from the group consisting of a benzophenone-based compound, a salicylate-based compound, a benzotriazole-based compound, and a triazine-based compound.

In the present specification, "-based compound" means a derivative of the compound following "-based". For example, "benzophenone-based compound" refers to a compound having benzophenone as a base skeleton and a substituent bonded to the benzophenone.

The content of the ultraviolet absorber with respect to the total mass of the resin film is generally equal to or greater than 1% by mass, preferably equal to or greater than 2% by mass, and more preferably equal to or greater than 3% by mass. The content of the ultraviolet absorber with respect to the total mass of the resin film is generally equal to or smaller than 10% by mass, preferably equal to or smaller than 8% by mass, and even more preferably equal to or smaller than 6% by mass. In a case where the content of the ultraviolet absorber is within the above range, the weather fastness of a resin film can be improved.

The substrate containing the imide-based polymer may further contain an inorganic material such as inorganic particles. The inorganic material is preferably a silicon material containing silicon atoms. In a case where the substrate containing the imide-based polymer contains an inorganic material such as silicon material, it is easy to set the tensile modulus of elasticity of the substrate containing the imide-based polymer to a value equal to or higher than 4.0 GPa. However, mixing the substrate containing the imide-based polymer with an inorganic material is not the only way to control the tensile modulus of elasticity of the substrate.

Examples of the silicon material containing silicon atoms include silica particles, quaternary alkoxysilane such as tetraethyl orthosilicate (TEOS), and a silicon compound such as a silsesquioxane derivative. Among these silicon materials, from the viewpoint of transparency and flexibility of the substrate containing the imide-based polymer, silica particles are preferable.

The average primary particle size of the silica particles is generally equal to or smaller than 100 nm. In a case where the average primary particle size of the silica particles is equal to or smaller than 100 nm, the transparency tends to be improved.

The average primary particle size of the silica particles in the substrate containing the imide-based polymer can be determined by the observation with a transmission electron microscope (TEM). As the primary particle size of the silica particles, the Feret's diameter measured using a transmission electron microscope (TEM) can be adopted. The average primary particle size can be determined by measuring primary particle sizes at 10 spots by TEM observation and calculating the average thereof. The particle size distribution of the silica particles that have not yet form the substrate containing the imide-based polymer can be determined using a commercially available laser diffraction particle size distribution analyzer.

In the substrate containing the imide-based polymer, in a case where the total amount of the imide-based polymer and the inorganic material is regarded as 10, the mixing ratio of imide-based polymer:inorganic material based on mass is preferably 1:9 to 10.0, more preferably 3:7 to 10:0, even more preferably 37 to 8:2, and still more preferably 3:7 to 7:3. The ratio of the inorganic material to the total mass of the imide-based polymer and the inorganic material is generally equal to or higher than 20% by mass, and preferably equal to or higher than 30% by mass. The ratio of the inorganic material to the total mass of the imide-based polymer and the inorganic material is generally equal to or lower than 90% by mass, and preferably equal to or lower than 70% by mass. In a case where the mixing ratio of imide-based polymer:inorganic material (silicon material) is within the above range, the transparency and mechanical strength of the substrate containing the imide-based polymer tend to be improved. Furthermore, it is easy to set the tensile modulus of elasticity of the substrate containing the imide-based polymer to a value equal to or higher than 4.0 GPa.

As long as the transparency and flexibility are not markedly impaired, the substrate containing the imide-based polymer may further contain components other than the imide-based polymer and the inorganic material. Examples of components other than the imide-based polymer and the inorganic material include an antioxidant, a release agent, a stabilizer, a coloring agent such as a bluing agent, a flame retardant, a lubricant, a thickener, and a leveling agent. The ratio of components other than the imide-based polymer and the inorganic material to the mass of the resin film is preferably higher than 0% and equal to or lower than 20% by mass, and more preferably higher than 0% and equal to or lower than 10% by mass.

In a case where the substrate containing the imide-based polymer contains the imide-based polymer and the silicon material, Si/N which represents a ratio of the number of silicon atoms to the number of nitrogen atoms within at least one main surface 10a is preferably equal to or higher than 8. Si/N which represents the ratio of the number of atoms is a value calculated from the abundance of silicon atoms and the abundance of nitrogen atoms that are obtained by evaluating the composition of the substrate containing the imide-based polymer by X-ray photoelectron spectroscopy (XPS).

In a case where Si/N within the main surface 10a of the substrate containing the imide-based polymer is equal to or higher than 8, the adhesiveness between the substrate and a functional layer 20 which will be described later is sufficient. From the viewpoint of adhesiveness, Si/N is more preferably equal to or higher than 9, and even more preferably equal to or higher than 10. Si/N is preferably equal to or lower than 50, and more preferably equal to or lower than 40.

(Thickness of Substrate)

The thickness of the substrate is more preferably equal to or smaller than 100 μm, even more preferably equal to or smaller than 80 μm, and most preferably equal to or smaller than 50 μm. In a case where the substrate has a small thickness, the difference in curvature between the front surface and the back surface of the folded substrate is reduced. Therefore, cracks and the like hardly occur, and the substrate is hardly broken even being folded plural times. On the other hand, from the viewpoint of ease of handling of the substrate, the thickness of the substrate is preferably equal to or greater than 3 μm, more preferably equal to or greater than 5 μm, and most preferably equal to or greater than 15 μm.

(Method for Preparing Substrate)

The substrate may be prepared by heat-melting a thermoplastic polymer, or may be prepared from a solution, in which a polymer is uniformly dissolved, by solution film formation (a solvent casting method) In the case of heat-melting film formation, the softening material and various additives described above can be added during heat melting. In contrast, in a case where the substrate is prepared by the solution film formation method, the softening material and various additives described above can be added to the polymer solution (hereinafter, also referred to as dope) in each preparation step. Furthermore, the softening material and various additives may be added at any point in time in a dope preparation process. In the dope preparation process, a step of preparing the dope by adding the additives may be additionally performed as a final preparation step.

In order to dry and/or bake the coating film, the coating film may be heated. The heating temperature of the coating film is generally 50° C. to 350° C. The coating film may be heated in an inert atmosphere or under reduced pressure. By the heating of the coating film, solvents can be evaporated and removed. The resin film may be formed by a method including a step of drying the coating film at 50° C. to 150° C. and a step of baking the dried coating film at 180° C. to 350° C.

A surface treatment may be performed on at least one main surface of the substrate.

In order to protect the surface of the substrate or maintain the smoothness of the substrate, a protective film may be bonded to one surface or both surfaces of the substrate. As the protective film, a protective film is preferable which is obtained by laminating a pressure sensitive adhesive containing an antistatic agent on one surface of a support. In a case where such a protective film is used, it is possible to prevent dust from adhering to the substrate in a case where a hardcoat layer is formed after the protective film is peeled off.

<Hardcoat Layer>

The hardcoat layer of the hardcoat film according to the embodiment of the present invention will be described.

In the present invention, the hardcoat layer contains a cured product of polyorganosilsesquioxane (a1) having an epoxy group.

The cured product of the polyorganosilsesquioxane (a1) having an epoxy group is preferably obtained by curing a curable composition containing the polyorganosilsesquioxane (a1) having an epoxy group by heating and/or irradiation with ionizing radiation.

(Polyorganosilsesquioxane (a1) Having Epoxy Group)

The polyorganosilsesquioxane (a1) having an epoxy group (also referred to as "polyorganosilsesquioxane (a1)") is preferably polyorganosilsesquioxane which has at least a siloxane constitutional unit containing an epoxy group and is represented by General Formula (1).

(1)

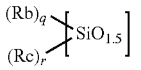

In General Formula (1), Rb represents a group containing an epoxy group, and Rc represents a monovalent group, q and r each represent a proportion of each of Rb and Rc in General Formula (1), q+r=100, q is greater than 0, and r is equal to or greater than 0. In a case where there is a plurality of Rb's and Rc's in General Formula (1), the plurality of Rb's and Rc's may be the same as or different from each other respectively. In a case where there is a plurality of Re's in General Formula (1), the plurality of Rc's may form a bond with each other.

[$SiO_{1.5}$] in General Formula (1) represents a structural portion composed of a siloxane bond (Si—O—Si) in the polyorganosilsesquioxane.

The polyorganosilsesquioxane is a network-type polymer or polyhedral cluster having a siloxane constitutional unit derived from a hydrolyzable trifunctional silane compound, and can form a random structure, a ladder structure, a cage structure, and the like by a siloxane bond. In the present invention, although the structural portion represented by [$SiO_{1.5}$] may be any of the above structures, it is preferable that the structural portion contains many ladder structures. In a case where the ladder structure is formed, the deformation recovery of the hardcoat film can be excellently maintained. Whether the ladder structure is formed can be qualitatively determined by checking whether or not absorption occurs which results from Si—O—Si expansion/contraction unique to the ladder structure found at around 1,020 to 1,050 $cm^{-1}$ by Fourier Transform Infrared Spectroscopy (FT-IR).

In general Formula (1). Rb represents a group containing an epoxy group.

Examples of the group containing an epoxy group include known groups having an oxirane ring.

Rb is preferably a group represented by the following Formulas (1b) to (4b).

(1b)

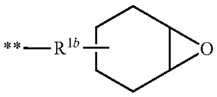

(2b)

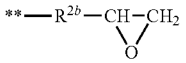

(3b)

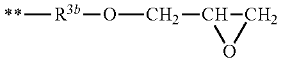

(4b)

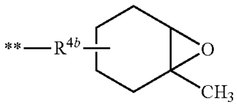

In Formulas (1b) to (4b), ** represents a portion linked to Si in General Formula (1), and $R^{1b}$, $R^{2b}$, $R^{3b}$, and $R^{4b}$ represent a substituted or unsubstituted alkylene group.

The alkylene group represented by $R^{1b}$, $R^{2b}$, $R^{3b}$, and $R^{4b}$ is preferably a linear or branched alkylene group having 1 to 10 carbon atoms, and examples thereof include a methylene group, a methyl methylene group, a dimethyl methylene group, an ethylene group an i-propylene group, a n-propylene group, a n-butylene group, a n-pentylene group, a n-hexylene group, a n-decylene group, and the like.

In a case where the alkylene group represented by $R^{1b}$, $R^{2b}$, $R^{3b}$, and $R^{4b}$ has a substituent, examples of the substituent include a hydroxyl group, a carboxyl group, an alkoxy group, an aryl group, a heteroaryl group, a halogen atom, a nitro group, a cyano group, a silyl group, and the like.

As $R^{1b}$, $R^{2b}$, $R^{3b}$, and $R^{4b}$, an unsubstituted linear alkylene group having 1 to 4 carbon atoms and an unsubstituted branched alkylene group having 3 or 4 carbon atoms are preferable, an ethylene group, a n-propylene group, or an i-propylene group is more preferable, and an ethylene group or an n-propylene group is even more preferable.

It is preferable that the polyorganosilsesquioxane (a1) has an alicyclic epoxy group (a group having a condensed ring structure of an epoxy group and an alicyclic group). Rb in General Formula (1) is preferably an alicyclic epoxy group, more preferably a group having an epoxycyclohexyl group, and even more preferably a group represented by Formula (1 b).

Rb in General Formula (1) is derived from a group (a group other than an alkoxy group and a halogen atom: for example, Rb in a hydrolyzable silane compound represented by Formula (B) which will be described later, or the like) bonded to a silicon atom in the hydrolyzable trifunctional silane compound used as a raw material of the polyorganosilsesquioxane.

Specific examples of Rb are as below, but the present invention is not limited thereto. In the following specific examples, ** represents a portion linked to Si in General Formula (1).

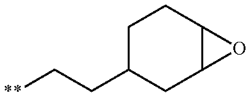

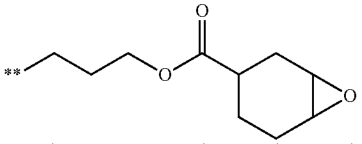

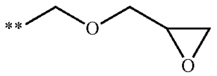

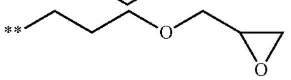

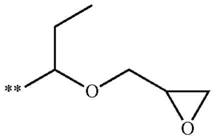

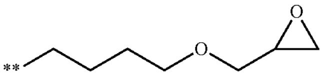

In General Formula (1). Rc represents a monovalent group.

Examples of the monovalent group represented by Rc include a hydrogen atom, a substituted or unsubstituted alkyl group, a substituted or unsubstituted cycloalkyl group, a substituted or unsubstituted alkenyl group, a substituted or unsubstituted aryl group, or a substituted or unsubstituted aralkyl group.

Examples of the alkyl group represented by Rc include an alkyl group having 1 to 10 carbon atoms. Examples thereof include linear or branched alkyl groups such as a methyl group, an ethyl group, a propyl group, a n-butyl group, an isopropyl group, an isobutyl group, a s-butyl group, a t-butyl group, and an isopentyl group.

Examples of the cycloalkyl group represented by Rc include a cycloalkyl group having 3 to 15 carbon atoms Examples thereof include a cyclobutyl group, a cyclopentyl group, a cyclohexyl group, and the like.

Examples of the alkenyl group represented by Rc include an alkenyl group having 2 to 10 carbon atoms. Examples of the alkenyl group include a linear or branched alkenyl group such as a vinyl group, an allyl group, or an isopropenyl group.

Examples of the aryl group represented by Rc include an aryl group having 6 to 15 carbon atoms Examples thereof include a phenyl group, a tolyl group, a naphthyl group, and the like.

Examples of the aralkyl group represented by Rc include an aralkyl group having 7 to 20 carbon atoms. Examples thereof include a benzyl group, a phenethyl group, and the like.

Examples of the substituted alkyl group, substituted cycloalkyl group, substituted alkenyl group, substituted aryl group, and substituted aralkyl group described above include groups obtained in a case where some or all of hydrogen atoms or main chain skeletons in the alkyl group, cycloalkyl group, alkenyl group, aryl group, and aralkyl group described above are substituted with at least one kind of group selected from the group consisting of an ether group, an ester group, a carbonyl group, a halogen atom (such as a fluorine atom), an acryl group, a methacryl group, a mercapto group, and a hydroxy group (hydroxyl group), and the like.

Rc is preferably a substituted or unsubstituted alkyl group, and more preferably an unsubstituted alkyl group having 1 to 10 carbon atoms.

In a case where there is a plurality of Rc's in General Formula (1), the plurality of Rc's may form a bond with each other. The number of Rc's forming a bond with each other is preferably 2 or 3, and more preferably 2.

A group ($Rc_2$) formed by the bonding of two Rc's is preferably an alkylene group formed by the bonding of the aforementioned substituted or unsubstituted alkyl groups represented by Rc.

Examples of the alkylene group represented by $Rc_2$ include linear or branched alkylene groups such as a methylene group, an ethylene group, a propylene group, an isopropylene group, a n-butylene group, an isobutylene group, a s-butylene group, a t-butylene group, a n-pentylene group, an isopentylene group, a s-pentylene group, a t-pentylene group, a n-hexylene group, an isohexylene group, a s-hexylene group, a t-hexylene group, a n-heptylene group, an isoheptylene group, a s-heptylene group, a t-heptylene group, a n-octylene group, an isooctylene group, a s-octylene group, and a t-octylene group.

The alkylene group represented by $Rc_2$ is preferably an unsubstituted alkylene group having 2 to 20 carbon atoms, more preferably an unsubstituted alkylene group having 2 to 20 carbon atoms, even more preferably an unsubstituted alkylene group having 2 to 8 carbon atoms, and particularly preferably a n-butylene group, a n-pentylene group, a n-hexylene group, a n-heptylene group, or a n-octylene group.

A group ($Rc_3$) formed by the bonding of three Rc's is preferably a trivalent group obtained in a case where any one of the hydrogen atoms in the alkylene group represented by $Rc_2$ is removed.

Rc in General Formula (1) is derived from a group (a group other than an alkoxy group and a halogen atom, for example, $Rc_1$ to $Rc_3$ in a hydrolyzable silane compound represented by Formulas (C1) to (C3) which will be described later, or the like) bonded to a silicon atom in the hydrolyzable silane compound used as a raw material of the polyorganosilsesquioxane.

In General Formula (1), q is greater than 0, and r is equal to or greater than 0.

q/(q+r) is preferably 0.5 to 1.0. In a case where the amount of the group represented by Rb is equal to or greater than 50% of the total amount of the groups represented by Rb and Rc contained in the polyorganosilsesquioxane (a1), the network composed of organic crosslinking groups is sufficiently formed. Therefore, the performances such as hardness and resistance to repeated folding can be excellently maintained.

q/(q+r) is more preferably 0.7 to 1.0, even more preferably 0.9 to 1.0, and particularly preferably 0.95 to 1.0.

It is also preferable that there is a plurality of Rc's in General Formula (1), and the plurality of Rc's form a bond with each other. In this case, r/(q+r) is preferably 0.005 to 0.20.

r/(q+r) is more preferably 0.005 to 0.10, even more preferably 0.005 to 0.05, and particularly preferably 0.005 to 0.025.

The number-average molecular weight (Mn) of the polyorganosilsesquioxane (a1) that is measured by gel permeation chromatography (GPC) and expressed in terms of standard polystyrene is preferably 500 to 6,000, more preferably 1,000 to 4,500, and even more preferably 1,500 to 3,000.

The molecular weight dispersity (Mw/Mn) of the polyorganosilsesquioxane (a1) that is measured by GPC and expressed in terms of standard polystyrene is, for example, 1.0 to 4.0, preferably 1.1 to 3.7, more preferably 1.2 to 3.0, even more preferably 1.3 to 2.5, and particularly preferably 1.45 to 1.80. Mn represents a number-average molecular weight.

The weight-average molecular weight and the molecular weight dispersity of the polyorganosilsesquioxane (a1) were measured using the following device under the following conditions.

Measurement device: trade name "LC-20AD" (manufactured by Shimadzu Corporation)

Columns: two Shodex KF-801 columns, KF-802, and KF-803 (manufactured by SHOWA DENKO K.K.)

Measurement temperature: 40° C.

Eluent: tetrahydrofuran (THF), sample concentration of 0.1% to 0.2% by mass

Flow rate: 1 mL/min

Detector: UV-VIS detector (trade name "SPD-20A", manufactured by Shimadzu Corporation)

Molecular weight: expressed in terms of standard polystyrene

<Method for Manufacturing Polyorganosilsesquioxane (a1)>

The polyorganosilsesquioxane (a1) can be manufactured by a known manufacturing method and is not particularly limited. The polyorganosilsesquioxane (a1) can be manufactured preferably by a method of hydrolyzing and condensing one kind of hydrolyzable silane compound or two or more kinds of hydrolyzable silane compounds. As the hydrolyzable silane compound, it is preferable to use a hydrolyzable trifunctional silane compound (a compound represented by Formula (B)) for forming a siloxane constitutional unit containing an epoxy group.

In a case where r in General Formula (1) is greater than 0, as the hydrolyzable silane compounds, it is preferable to use the compounds represented by the following Formula (C1), (C2), or (C3) in combination.

$$Rb—Si(X^2)_3 \quad (B)$$

Rb in Formula (B) has the same definition as Rb in General Formula (1), and preferred examples thereof are also the same.

$X^2$ in Formula (B) represents an alkoxy group or a halogen atom.

Examples of the alkoxy group represented by $X^2$ include an alkoxy group having 1 to 4 carbon atoms such as a methoxy group, an ethoxy group, a propoxy group, an isopropyloxy group, a butoxy group, and an isobutyloxy group.

Examples of the halogen atom represented by $X^2$ include a fluorine atom, a chlorine atom, a bromine atom, an iodine atom, and the like.

As $X^2$, an alkoxy group is preferable, and a methoxy group and an ethoxy group are more preferable. Three $X^2$'s may be the same as or different from each other.

The compound represented by Formula (B) is a compound forming a siloxane constitutional unit having Rb.

$$Rc_1—Si(X^3)_3 \quad (C1)$$

$$(X^3)_3Si—Rc_2—Si(X^3)_3 \quad (C2)$$

-continued (C3)

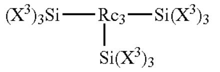

$Rc_1$ in Formula (C1) has the same definition as Rc in General Formula (1), and preferred examples thereof are also the same.

$Rc_2$ in Formula (C2) has the same definition as the group ($Rc_2$) formed in a case where two Rc's in General Formula (1) are bonded to each other, and preferred examples thereof are also the same.

$Rc_3$ in Formula (C3) has the same definition as the group ($Rc_3$) formed in a case where three Rc's in General Formula (1) are bonded to each other, and preferred examples thereof are also the same.

$X^3$ in Formulas (C1) to (C3) has the same definition as $X^2$ in Formula (B), and preferred examples thereof are also the same. The plurality of $X^3$'s may be the same as or different from each other.

As the hydrolyzable silane compound, hydrolyzable silane compounds other than the compounds represented by Formulas (B) and (C1) to (C3) may be used in combination.

Examples thereof include a hydrolyzable trifunctional silane compound, a hydrolyzable monofunctional silane compound, a hydrolyzable difunctional silane compound, and the like other than the compounds represented by Formulas (B) and (C1) to (C3).

In a case where Rc is derived from $Rc_1$ to $Rc_3$ in the hydrolyzable silane compounds represented by Formulas (C1) to (C3), in order to adjust q/(q+r) in General Formula (1), a mixing ratio (molar ratio) among the compounds represented by Formulas (B) and (C1) to (C3) may be adjusted.

Specifically, for example, in order to adjust q/(q+r) to 0.5 to 1.0, a value represented by the following (Z2) may be set to 0.5 to 1.0, and a method of hydrolyzing and condensing these compounds may be used to manufacture the polyorganosilsesquioxane (a1).

(Z2)={compound represented by Formula (B)(molar amount)}/{compound represented by Formula (B)(molar amount)+compound represented by Formula (C1)(molar amount)+compound represented by Formula (C2)(molar amount)×2+compound represented by Formula (C3)(molar amount)×3}

The amount of the above hydrolyzable silane compounds used and the composition thereof can be appropriately adjusted according to the desired structure of the polyorganosilsesquioxane (a1).

Furthermore, the hydrolysis and condensation reactions of the hydrolyzable silane compounds can be performed simultaneously or sequentially. In a case where the above reactions are sequentially performed, the order of performing the reactions is not particularly limited.

The hydrolysis and condensation reactions of the hydrolyzable silane compounds can be carried out in the presence or absence of a solvent, and are preferably carried out in the presence of a solvent.

Examples of the solvent include aromatic hydrocarbons such as benzene, toluene, xylene, and ethylbenzene; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile, alcohols such as methanol, ethanol, isopropyl alcohol, and butanol, and the like.

As the solvent, ketones or ethers are preferable. One kind of solvent can be used singly, or two or more kinds of solvents can be used in combination.

The amount of the solvent used is not particularly limited, and can be appropriately adjusted according to the desired reaction time or the like such that the amount falls into a range of 0 to 2,000 parts by mass with respect to the total amount (100 parts by mass) of the hydrolyzable silane compounds.

The hydrolysis and condensation reactions of the hydrolyzable silane compounds are preferably performed in the presence of a catalyst and water. The catalyst may be an acid catalyst or an alkali catalyst.

Examples of the acid catalyst include mineral acids such as hydrochloric acid, sulfuric acid, nitric acid, phosphoric acid, and boric acid; phosphoric acid esters; carboxylic acids such as acetic acid, formic acid, and trifluoroacetic acid; sulfonic acids such as methanesulfonic acid, trifluoromethanesulfonic acid, and p-toluenesulfonic acid; solid acids such as activated clay; Lewis acids such as iron chloride, and the like.

Examples of the alkali catalyst include alkali metal hydroxides such as lithium hydroxide, sodium hydroxide, potassium hydroxide, and cesium hydroxide; alkali earth metal hydroxides such as magnesium hydroxide, calcium hydroxide, and barium hydroxide; alkali metal carbonate such as lithium carbonate, sodium carbonate, potassium carbonate, and cesium carbonate; alkali earth metal carbonates such as magnesium carbonate; alkali metal hydrogen carbonates such as lithium hydrogen carbonate, sodium hydrogen carbonate, potassium hydrogen carbonate, and cesium hydrogen carbonate; alkali metal organic acid salts (for example, acetate) such as lithium acetate, sodium acetate, potassium acetate, and cesium acetate; alkali earth metal organic acid salts (for example, acetate) such as magnesium acetate; alkali metal alkoxides such as lithium methoxide, sodium methoxide, sodium ethoxide, sodium isopropoxide, potassium ethoxide, and potassium t-butoxide; alkali metal phenoxides such as sodium phenoxide; amines (tertiary amines and the like) such as triethylamine, N-methylpiperidine, 1,8-diazabicyclo[5.4.0]undec-7-ene, and 1,5-diazabicyclo[4.3.0]non-5-ene, nitrogen-containing aromatic heterocyclic compounds such as pyridine, 2,2'-bipyridyl, and 1,10-phenanthroline, and the like.

One kind of catalyst can be used singly, or two or more kinds of catalysts can be used in combination. Furthermore, the catalyst can be used in a state of being dissolved or dispersed in water, a solvent, or the like.

The amount of the catalyst used is not particularly limited, and can be appropriately adjusted within a range of 0.002 to 0.200 mol with respect to the total amount (1 mol) of the hydrolyzable silane compounds.

The amount of water used in the above hydrolysis and condensation reactions is not particularly limited, and can be appropriately adjusted within a range of 0.5 to 20 mol with respect to the total amount (1 mol) of the hydrolyzable silane compounds.

The method of adding water is not particularly limited. The entirety of water to be used (total amount of water to be used) may be added at once or added sequentially. In a case where water is added sequentially, the water may be added continuously or intermittently.

As the reaction conditions for performing the hydrolysis and condensation reactions of the hydrolyzable silane compounds, it is particularly important to select reaction conditions such that the condensation rate of the polyorganosilsesquioxane (a1) is equal to or higher than 80%. The reaction temperature of the hydrolysis and condensation reactions is, for example, 40° C. to 100° C. and preferably 45° C. to 80° C. In a case where the reaction temperature is controlled within the above range, the condensation rate tends to be controlled and become equal to or higher than 80%. The reaction time of the hydrolysis and condensation reactions is, for example, 0.1 to 10 hours and preferably 1.5 to 8 hours. Furthermore, the hydrolysis and condensation reactions can be carried out under normal pressure or under pressure that is increased or reduced. The hydrolysis and condensation reactions may be performed, for example, in any of a nitrogen atmosphere, an inert gas atmosphere such as argon gas atmosphere, or an aerobic atmosphere such as an air atmosphere. Among these, the inert gas atmosphere is preferable.

By the hydrolysis and condensation reactions of the hydrolyzable silane compounds described above, the polyorganosilsesquioxane (a1) is obtained. After the hydrolysis and condensation reactions are finished, it is preferable to neutralize the catalyst so as to inhibit the ring opening of the epoxy group. In addition, the polyorganosilsesquioxane (a1) may be separated and purified by a separation method such as rinsing, acid cleaning, alkali cleaning, filtration, concentration, distillation, extraction, crystallization, recrystallization, or column chromatography, or by a separation method using these in combination.

In the hardcoat layer of the hardcoat film according to the embodiment of the present invention, from the viewpoint of hardness of the film, the condensation rate of the polyorganosilsesquioxane (a1) is preferably equal to or higher than 80%. The condensation rate is more preferably equal to or higher than 90%, and more preferably equal to or higher than 95%.

In a case where the $^{29}$Si nuclear magnetic resonance (NMR) spectrum is measured for a hardcoat film sample having the hardcoat layer containing the cured product of the polyorganosilsesquioxane (a1), the condensation rate can be calculated using the measurement result.

In the cured product of the polyorganosilsesquioxane (a1) having an epoxy group, it is preferable that the epoxy group undergoes ring opening by a polymerization reaction.

In the hardcoat layer of the hardcoat film according to the embodiment of the present invention, from the viewpoint of hardness of the film, the ring opening rate of the epoxy group in the cured product of the polyorganosilsesquioxane (a1) is preferably equal to or higher than 40%. The ring opening rate is more preferably equal to or higher than 50%, and even more preferably equal to or higher than 60%.

The ring opening rate can be obtained by analyzing a composition for forming a hardcoat layer containing polyorganosilsesquioxane (a1) by means of Fourier transform infrared spectroscopy (FT-IR) single reflection attenuated total reflection (ATR) before and after the composition is totally cured and treated with heat. From the change in the height of a peak resulting from the epoxy group, the ring opening rate can be calculated.

One kind of polyorganosilsesquioxane (a1) may be used singly, or two or more kinds of polyorganosilsesquioxane (a1) having different structures may be used in combination.

The content rate of the cured product of the polyorganosilsesquioxane (a1) with respect to the total mass of the hardcoat layer is preferably equal to or higher than 50% by mass and equal to or lower than 100% by mass, more preferably equal to or higher than 70% by mass and equal to or lower than 100% by mass, and even more preferably equal to or higher than 80% by mass and equal to or lower than 100% by mass.

(Other Additives)

The hardcoat layer may contain components other than the above, for example, a dispersant, a leveling agent, an antifouling agent, an antistatic agent, an ultraviolet absorber, an antioxidant, and the like.

The hardcoat layer may or may not contain a cured product of a compound having a (meth)acryloyl group. The hardcoat layer contains or does not contain a cured product of a compound having a (meth)acryloyl group. In a case where the hardcoat layer contains the cured product, the content rate of the cured product of the compound having a (meth)acryloyl group is preferably less than 10% by mass with respect to the total amount of the polyorganosilsesquioxane (a1) and the cured product of the (meth)acrylate compound. In a case where the content rate of the cured product of the (meth)acrylate compound in the hardcoat layer is less than 10% by mass, the deformation recovery of the hardcoat film is improved, and hence the hardness is increased.

The type of the antistatic agent is not particularly limited, and an ion conducting or electron conducting antistatic agent can be preferably used. Specifically, as an electron conducting antistatic agent, for example, SEPLEGYDA (manufactured by Shin-Etsu Polymer Co., Ltd.) using a polythiophene conductive polymer or the like can be preferably used.

(Film Thickness)

The film thickness of the hardcoat layer is not particularly limited, but is preferably 1 to 100 μm, more preferably 5 to 50 μm, and even more preferably 10 to 20 μm.

The thickness of the hardcoat layer is calculated by observing the cross section of the hardcoat film by using an optical microscope. The cross-sectional sample can be prepared by a microtome method using a cross section cutting device ultramicrotome, a cross section processing method using a focused ion beam (FIB) device, or the like.

<Mixed Layer>

The mixed layer of the hardcoat film according to the embodiment of the present invention contains a cured product of a compound (b1) having an epoxy group and a cured product of a compound (b2) having two or more (meth) acryloyl groups in one molecule.

The cured product of the compound (b1) having an epoxy group and the cured product of the compound (b2) having two or more (meth)acryloyl groups in one molecule are preferably obtained by curing a curable composition containing the compound (b1) having an epoxy group and the compound (b2) having two or more (meth)acryloyl groups in one molecule by means of heating and/or irradiation with ionizing radiation.

(Compound (b1) Having Epoxy Group)

As the compound (b1) having an epoxy group (also referred to as "epoxy compound (b1)"), a compound having one or more epoxy groups (oxirane rings) in a molecule can be used. The compound (b1) is not particularly limited, and examples thereof include an epoxy compound having an alicycle, an aromatic epoxy compound, an aliphatic epoxy compound, the polyorganosilsesquioxane (a1) having an epoxy group used for forming the aforementioned hardcoat layer, and the like.

The epoxy compound having an alicycle is not particularly limited, and examples thereof include known compounds having one or more alicycles and one or more epoxy groups in a molecule.

Examples of such compounds include (1) compound having an alicyclic epoxy group;

(2) compound in which an epoxy group is directly bonded to an alicycle by a single bond;

(3) compound having an alicycle and a glycidyl ether group in a molecule (glycidyl ether-type epoxy compound), and the like.

Examples of (1) compound having an alicyclic epoxy group include a compound represented by Formula (i).

(i)

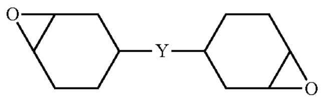

In Formula (i), Y represents a single bond or a linking group (a divalent group having one or more atoms). Examples of the linking group include a divalent hydrocarbon group, an alkenylene group in which some or all of carbon-carbon double bonds are epoxidized, a carbonyl group, an ether bond, an ester bond, a carbonate group, an amide group, a group consisting of a plurality of these groups linked to one another, and the like.

Examples of the divalent hydrocarbon group include a substituted or unsubstituted linear or branched alkylene group having 1 to 18 carbon atoms, a divalent substituted or unsubstituted alicyclic hydrocarbon group, and the like. Examples of the alkylene group having 1 to 18 carbon atoms include a methylene group, a methyl methylene group, a dimethyl methylene group, an ethylene group, an i-propylene group, a n-propylene group, and the like. Examples of the divalent alicyclic hydrocarbon group include divalent cycloalkylene groups (including cycloalkylidene groups) such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group Examples of the alkenylene group in which some or all of carbon-carbon double bonds are epoxidized (sometimes referred to as "epoxidized alkenylene group") include linear or branched alkenylene groups having 2 to 8 carbon atoms such as a vinylene group, a propenylene group, a 1-butenylene group, a 2-butenylene group, a butadienylene group, a pentenylene group, a hexenylene group, a beptenylene group, and an octenylene group, and the like. Particularly, as the epoxidized alkenylene group, an alkenylene group in which all of carbon-carbon double bonds are epoxidized is preferable, and an alkenylene group having 2 to 4 carbon atoms in which all of carbon-carbon double bonds are epoxidized is more preferable.

Typical examples of the alicyclic epoxy compound represented by Formula (i) include 3,4,3',4'-diepoxybicyclohexane, compounds represented by Formulas (i-1) to (i-10), and the like. In Formulas (i-5) and (i-7), l and m each represent an integer of 1 to 30. R' in Formula (i-5) represents an alkylene group having 1 to 8 carbon atoms. R' is particularly preferably a linear or branched alkylene group having 1 to 3 carbon atoms such as a methylene group, an ethylene group, a n-propylene group, or an i-propylene group. In Formulas (i-9) and (i-10), n1 to n6 each represent an integer of 1 to 30. Examples of the alicyclic epoxy compound represented by Formula (i) also include 2,2-bis(3,4-epoxycyclohexyl)propane, 1,2-bis(3,4-epoxycyclohexyl)ethane, 2,3-bis(3,4-epoxycyclohexyl)oxirane, bis(3,4-epoxycyclohexylmethyl)ether, and the like.

(i-1)

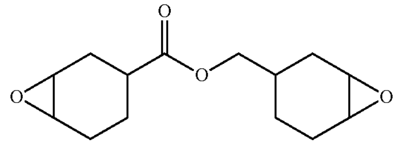

(i-2)

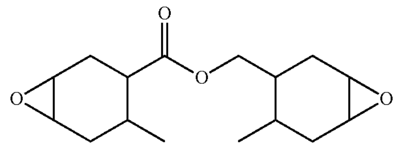

(i-3)

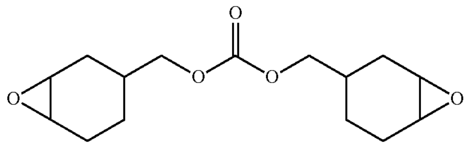

(i-4)

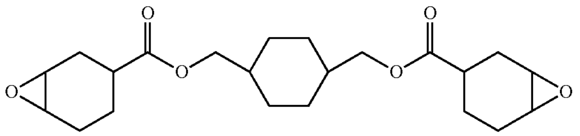

(i-5)

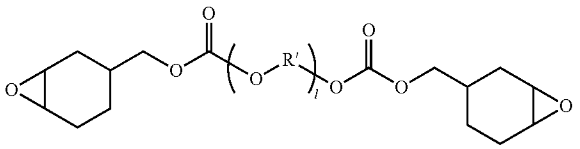

(i-6)

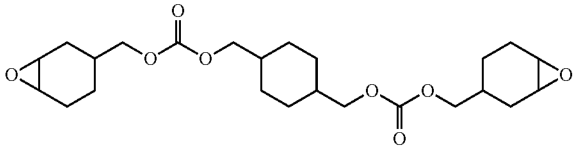

(i-7)

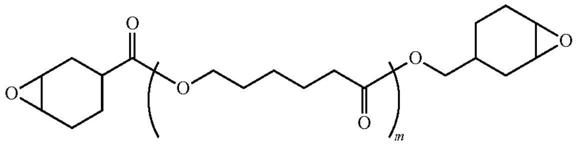

(i-8)

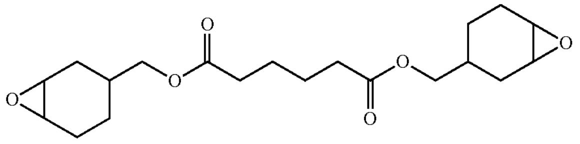

(i-9)

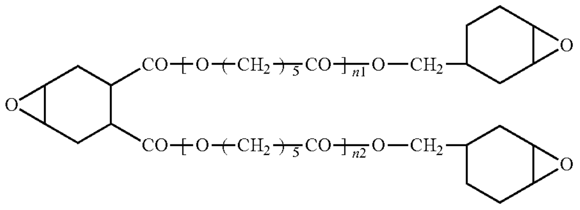

-continued (i-10)

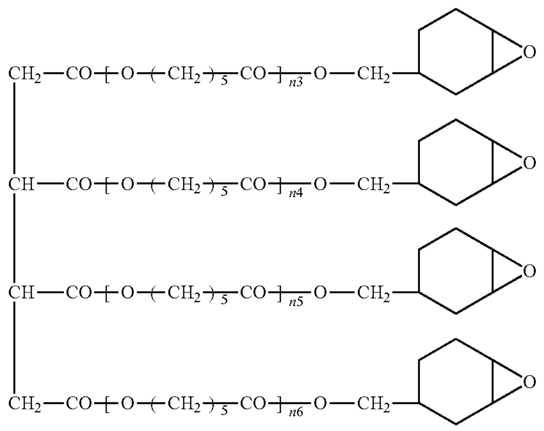

Examples of (2) compound in which an epoxy group is directly bonded to an alicycle by a single bond include a compound represented by Formula (ii) and the like.

(ii)

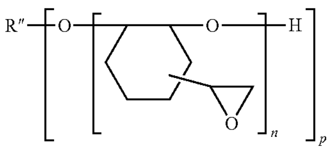

In Formula (ii), R" represents a group (p-valent organic group) obtained by removing p pieces of hydroxyl groups (—OH) from the structural formula of a p-valent alcohol, and p and n each represent a natural number. Examples of the p-valent alcohol [R"(OH)p] include a polyhydric alcohol such as 2,2-bis(hydroxymethyl)-1-butanol (an alcohol having 1 to 15 carbon atoms) and the like, p is preferably 1 to 6, and n is preferably 1 to 30. In a case where p is equal to or greater than 2, n's for each group in the parentheses (in the outer parentheses) may be the same as or different from each other. Specific examples of the compound represented by Formula (ii) include a 1,2-epoxy-4-(2-oxiranyl)cyclohexane adduct of 2,2-bis(hydroxymethyl)-1-butanol [such as "EHPE3150" (trade name, manufactured by Daicel Corporation)], and the like.

Examples of (3) compound having an alicycle and a glycidyl ether group in a molecule include a glycidyl ether of an alicyclic alcohol (particularly, an alicyclic polyhydric alcohol). More specifically, examples thereof include a compound obtained by hydrogenating a bisphenol A-type epoxy compound such as 2,2-bis[4-(2,3-epoxypropoxy)cyclohexyl]propane or 2,2-bis[3,5-dimethyl-4-(2,3-epoxypropoxy)cyclohexyl]propane (a hydrogenated bisphenol A-type epoxy compound), a compound obtained by hydrogenating a bisphenol F-type epoxy compound such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, or bis[3,5-dimethyl-4-(2,3-epoxypropoxy)cyclohexyl]methane (a hydrogenated bisphenol F-type epoxy compound); a hydrogenated biphenol-type epoxy compound; a hydrogenated phenol novolac-type epoxy compound; a hydrogenated cresol novolak-type epoxy compound; a hydrogenated cresol novolak-type epoxy compound of bisphenol A; a hydrogenated naphthalene-type epoxy compound; a hydrogenated epoxy compound of an epoxy compound obtained from trisphenolmethane; a hydrogenated epoxy compound of the following aromatic epoxy compound, and the like.

Examples of the aromatic epoxy compound include a epi-bis glycidyl ether-type epoxy resin obtained by a condensation reaction between bisphenols [for example, bisphenol A, bisphenol F, bisphenol S, fluorene bisphenol, and the like] and epihalohydrin, a high-molecular-weight epi-bis glycidyl ether-type epoxy resin obtained by further subjecting the epi-bis glycidyl ether-type epoxy resin to an addition reaction with the above bisphenols; a novolac/alkyl glycidyl ether-type epoxy resin obtained by causing a condensation reaction between phenols [for example, phenol, cresol, xylenol, resorcin, catechol, bisphenol A, bisphenol F, bisphenol S, and the like] and an aldehyde [for example, formaldehyde, acetaldehyde, benzaldehyde, hydroxybenzaldehyde, salicylaldehyde, and the like] and further causing a condensation reaction between the polyhydric alcohols obtained by the above condensation reaction with epihalohydrin, an epoxy compound obtained by bonding two phenol skeletons to the 9-position of a fluorene ring, removing hydrogen atoms from hydroxy groups of the phenol skeletons, and bonding a glycidyl group to the remaining oxygen atoms directly or through an alkyleneoxy group, and the like.

Examples of the aliphatic epoxy compound include a glycidyl ether of an s-valent alcohol (s is a natural number) having no cyclic structure, a glycidyl ester of a monovalent or polyvalent carboxylic acid [for example, acetic acid, propionic acid, butyric acid, stearic acid, adipic acid, sebacic acid, maleic acid, itaconic acid, or the like]; epoxidized oils and fats having a double bond such as epoxidized linseed oil, epoxidized soybean oil, and epoxidized castor oil; epoxidized polyolefin (Including polyalkadiene) such as epoxidized polybutadiene, and the like. Examples of the s-valent alcohol having no cyclic structure include a monohydric alcohols such as methanol, ethanol, 1-propyl alcohol, isopropyl alcohol, or 1-butanol; a dihydric alcohol such as ethylene glycol, 1,2-propanediol, 1,3-propanediol, 1,4-butanediol, neopentyl glycol, 1,6-hexanediol, diethylene glycol, triethylene glycol, tetraethylene glycol, dipropylene glycol, polyethylene glycol, or polypropylene glycol; a polyhydric alcohol having a valency equal to or higher than 3 such as glycerin, diglycerin, erythritol, trimethylolethane, trimethylolpropane, pentaerythritol, dipentaerythritol, or sorbitol, and the like. The s-valent alcohol may be polyether polyol, polyester polyol, polycarbonate polyol, polyolefin polyol, or the like.

The epoxy compound (b1) is preferably polyorganosilsesquioxane having an epoxy group, and the preferred range of this compound is the same as that of the polyorganosilsesquioxane (a1) having an epoxy group contained in the aforementioned hardcoat layer.

One kind of epoxy compound (b1) may be used singly, or two or more kinds of epoxy compounds (b1) having different structures may be used in combination.

The content rate of the cured product of the epoxy compound (b1) with respect to the total mass of the mixed layer is preferably equal to or higher than 10% by mass and equal to or lower than 90% by mass, more preferably equal to or higher than 20% by mass and equal to or lower than 80% by mass, and even more preferably equal to or higher than 25% by mass and equal to or lower than 75% by mass.

(Compound (b2) Having Two or More (meth)acryloyl Groups in One Molecule)

The compound (b2) having two or more (meth)acryloyl groups in one molecule (also referred to as "polyfunctional (meth)acrylate compound (b2)") is preferably a compound having three or more (meth)acryloyl groups in one molecule.

The polyfunctional (meth)acrylate compound (b2) may be a crosslinkable monomer, a crosslinkable oligomer, or a crosslinkable polymer.

Examples of polyfunctional (meth)acrylate compound (b2) include an ester of a polyhydric alcohol and a (meth) acrylic acid. Specifically, examples thereof include pentaerythritol tri(meth)acrylate, pentaerythritol tetra(meth) acrylate, trimethylolpropane tri(meth)acrylate, trimethylolethane tri(meth)acrylate, ditrimethylolpropane tetra(meth)acrylate, dipentaerythritol tetra(meth)acrylate, dipentaerythritol pentaacrylate, dipentaerythritol hexaacrylate, pentaerythritol hexa(meth)acrylate, and the like. In view of a high degree of crosslinking, pentaerythritol triacrylate, pentaerythritol tetraacrylate, dipentaerythritol pentaacrylate, dipentaerythritol hexaacrylate, or a mixture of these is preferable.

One kind of poly functional (meth)acrylate compound (b2) may be used singly, or two or more kinds of polyfunctional (meth)acrylate compounds (b2) having different structures may be used in combination.

In the mixed layer, the content rate of the cured product of the polyfunctional (meth)acrylate compound (b2) is preferably equal to or higher than 10% by mass with respect to the total amount of the cured product of the epoxy compound (b1) and the cured product of the poly functional (meth)acrylate compound (b2). In a case where the content rate of the cured product of the polyfunctional (meth) acrylate compound (b2) in the mixed layer is within the above range, the scratch resistance of the hardcoat film can be improved.

In the mixed layer, the content rate of the cured product of the polyfunctional (meth)acrylate compound (b2) with respect to the total amount of the cured product of the epoxy compound (b1) and the cured product of the polyfunctional (meth)acrylate compound (b2) is preferably 10% by mass to 90% by mass, and more preferably 20% by mass to 80% by mass.

(Other Additives)

The mixed layer may contain components other than the above, for example, a dispersant, a leveling agent, an antifouling agent, an antistatic agent, an ultraviolet absorber, an antioxidant, a cured product of another polymerizable compound, and the like.

The type of the antistatic agent is not particularly limited, and an ion conducting or electron conducting antistatic agent can be preferably used. Specifically, as an electron conducting antistatic agent, for example, SEPLEGYDA (manufactured by Shin-Etsu Polymer Co., Ltd.) using a polythiophene conductive polymer or the like can be preferably used.

Examples of the cured product of another polymerizable compound include a cured product of a compound having an epoxy group and a (meth)acryloyl group in one molecule and the like. Specifically, examples of the compound include cured products such as Cyclomer M100 manufactured by Daicel Corporation, Light ESTER G (trade name) manufactured by KYOEISHA CHEMICAL Co., LTD, 4HBAGE manufactured by Nippon Kasei Chemical Co., Ltd, an SP series (trade name) such as SP-1506, 500, SP-1507, and 480 and a VR series such as VR-77 manufactured by Showa High Polymer Co., Ltd., and EA-1010/ECA, EA-11020, EA-1025, and EA-6310/ECA (trade names) manufactured by SHIN-NAKAMURA CHEMICAL CO, LTD.

(Film Thickness)

The film thickness of the mixed layer is preferably 0.05 μm to 10 μm. In a case where the film thickness of the mixed layer is equal to or greater than 0.05 μm, the scratch resistance of the film is improved. In a case where the film thickness of the mixed layer is equal to or smaller than 10 μm, the hardness and resistance to repeated folding are improved.

The film thickness of the mixed layer is more preferably 0.1 μm to 10 μm, even more preferably 0.1 μm to 5 μm, and particularly preferably 0.1 μm to 3 μm.

In a case where the hardcoat film according to the embodiment of the present invention additionally has an anti-scratch layer which will be described later, it is preferable that the total thickness of the mixed layer and the anti-scratch layer is within the above range.

In the hardcoat film according to the embodiment of the present invention, it is preferable that the hardcoat layer and the mixed layer are bonded to each other by a covalent bond. In a particularly preferred aspect, in a case where the epoxy group of the polyorganosilsesquioxane (a1) in the hardcoat layer and the epoxy group of the epoxy compound (b1) in the mixed layer form a bond at the interface between the two layers, a laminated structure with high adhesiveness is obtained, and higher scratch resistance can be exhibited.

<Other Layers>

The hardcoat film according to the embodiment of the present invention may further have other layers in addition to the hardcoat layer and the mixed layer. For example, it is preferable to adopt an aspect in which the hardcoat layer is provided on both surfaces of the substrate, an aspect in which an easily-adhesive layer for improving adhesiveness is between the substrate and the hardcoat layer, an aspect in which the hardcoat film has an antistatic layer for imparting antistatic properties, an aspect in which one antireflection layer or a plurality of antireflection layers is laminated on the mixed layer for preventing reflection, an aspect in which an antifouling layer for imparting antifouling properties or an anti-scratch layer for imparting scratch resistance is provided on the mixed layer, or the like. Furthermore, a plurality of these aspects may be adopted.

It is preferable that the hardcoat film according to the embodiment of the present invention has an anti-scratch layer on one surface of the mixed layer opposite to the other surface thereof coming into contact with the hardcoat layer. In a case where the hardcoat film has the anti-scratch layer, the scratch resistance can be further improved (Anti-Scratch Layer)

It is preferable that the anti-scratch layer contains a cured product of a compound (c1) having two or more (meth) acryloyl groups in one molecule (also referred to as "poly functional (meth)acrylate compound (c1)").

The polyfunctional (meth)acrylate compound (c1) is the same as the aforementioned polyfunctional (meth)acrylate compound (b2), and the preferred ranges thereof are also the same.

One kind of polyfunctional (meth)acrylate compound (c1) may be used singly, or two or more kinds of polyfunctional (meth)acrylate compounds (c1) having different structures may be used in combination.

The content rate of the cured product of the polyfunctional (meth)acrylate compound (c1) with respect to the total mass of the anti-scratch layer is preferably equal to or higher than 80% by mass, more preferably equal to or higher than 85% by mass, and even more preferably equal to or higher than 90% by mass.

(Other Additives)

The anti-scratch layer may contain components other than the above, for example, inorganic particles, a leveling agent, an antifouling agent, an antistatic agent, a slip agent, an antioxidant, and the like.

Particularly, it is preferable that the anti-scratch layer contains the following fluorine-containing compound as a slip agent.

The type of the antistatic agent is not particularly limited, and an ion conducting or electron conducting antistatic agent can be preferably used Specifically, as an electron conducting antistatic agent, for example, SEPLEGYDA (manufactured by Shin-Etsu Polymer Co., Ltd.) using a polythiophene conductive polymer or the like can be preferably used.

[Fluorine-Containing Compound]

The fluorine-containing compound may be any of a monomer, an oligomer, or a polymer. It is preferable that the fluorine-containing compound has substituents that contribute to the bond formation or compatibility of the compound with the polyfunctional (meth)acylate compound (c1) in the anti-scratch layer. These substituents may be the same as or different from each other. It is preferable that the compound has a plurality of such substituents.

The substituents are preferably polymerizable groups, and may be polymerizable reactive groups showing any of radical polymerization properties, polycondensation properties, cationic polymerization properties, anionic polymerization properties, and addition polymerization properties. As the substituents, for example, an acryloyl group, a methacryloyl group, a vinyl group, an allyl group, a cinnamoyl group, an epoxy group, an oxetanyl group, a hydroxyl group, a polyoxyalkylene group, a carboxyl group, an amino group, and the like are preferable. Among these, radically polymerizable groups are preferable, and particularly, an acryloyl group and a methacryloyl group are preferable.

The fluorine-containing compound may be a polymer or an oligomer with a compound having no fluorine atom.

The fluorine-containing compound is preferably a fluorine-based compound represented by General Formula (F).

$$(R^f)\text{—}[(W)\text{—}(R^A)_{nf}]_{mf}$$

(In the formula, $R^f$ represents a (per)fluoroalkyl group or a (per)fluoropolyether group, W represents a single bond or a linking group, and $R^A$ represents a polymerizable unsaturated group, nf represents an integer of 1 to 3. mf represents an integer of 1 to 3.)

In General Formula (F), $R^A$ represents a polymerizable unsaturated group. The polymerizable unsaturated group is preferably a group having an unsaturated bond capable of causing a radical polymerization reaction by being irradiated with active energy rays such as ultraviolet or electron beams (that is, the polymerizable unsaturated group is preferably a radically polymerizable group). Examples thereof include a (meth)acryloyl group, a (meth)acryloyloxy group, a vinyl group, an allyl group, and the like. Among these, a (meth) acryloyl group, a (meth)acryloyloxy group, and groups obtained by substituting any hydrogen atom in these groups with a fluorine atom are preferably used.

In General Formula (F), $R^f$ represents a (per)fluoroalkyl group or a (per)fluoropolyether group.

The (per)fluoroalkyl group represents at least either a fluoroalkyl group or a perfluoroalkyl group, and the (per) fluoropolyether group represents at least either a fluoropolyether group or a perfluoropolyether group From the viewpoint of scratch resistance, it is preferable that the fluorine content rate in $R^f$ is high.

The (per)fluoroalkyl group is preferably a group having 1 to 20 carbon atoms, and more preferably a group having 1 to 10 carbon atoms.

The (per)fluoroalkyl group may be a linear structure (for example, $—CF_2CF_3$, $—CH_2(CF_2)_4H$, $—CH_2(CF_2)_8CF_3$, $—CH_2CH_2(CF_2)_4H$), a branched structure (for examples, $—CH(CF_3)_2$, $—CH_2CF(CF_3)_2$, $—CH(CH_3)CF_2CF_3$, $—CH(CH_3)(CF_2)_5CF_2H$), or an alicyclic structure (preferably a 5- or 6-membered ring, for example, a perfluorocyclohexyl group, a perfluorocyclopentyl group, and an alkyl group substituted with these groups).

The (per)fluoropolyether group refers to a (per)fluoroalkyl group having an ether bond, and may be a monovalent group or a group having a valence of equal to or higher than 2 Examples of the fluoropolyether group include $—CH_2OCH_2CF_2CF_3$, $—CH_2CH_2CH_2C_4F_8H$, $—CH_2CH_2OCH_2CH_2C_8F_{17}—$, $—CH_2CH_2OCF_2CF_2OCF_2CF_2H$, a fluorocycloalkyl group having 4 to 20 carbon atoms with four or more fluorine atoms, and the like. Examples of the perfluoropolyether group include $—(CF_2O)_{pf}—(CF_2CF_2O)_{qf}—$, $—[CF(CF_3)CF_2O]_{pf}—[CF(CF_3)]_{qf}—$, $—(CF_2CF_2CF_2O)_{pf}—$, $—(CF_2CF_2O)_{pf}—$, and the like.

pf and qf each independently represent an integer of 0 to 20. Here, pf+qf is an integer equal to or greater than 1.

The sum of pf and qf is preferably 1 to 83, more preferably 1 to 43, and even more preferably 5 to 23.

From the viewpoint of excellent scratch resistance, the fluorine-containing compound particularly preferably has a perfluoropolyether group represented by $—(CF_2O)_{pf}—(CF_2CF_2O)_{qf}—$.

In the present invention, the fluorine-containing compound preferably has a perfluoropolyether group and has a plurality of polymerizable unsaturated groups in one molecule.

In General Formula (F), W represents a linking group. Examples of W include an alkylene group, an arylene group, a heteroalkylene group, and a linking group obtained by combining these groups. These linking groups may further have an oxy group, a carbonyl group, a carbonyloxy group, a carbonylimino group, a sulfonamide group, and a functional group obtained by combining these groups.

W is preferably an ethylene group, and more preferably an ethylene group bonded to a carbonylimino group.

The content of fluorine atoms in the fluorine-containing compound is not particularly limited, but is preferably equal to or greater than 20% by mass, more preferably 30% to 70% by mass, and even more preferably 40% to 70% by mass.

As the fluorine-containing compound, for example, R-2020, M-2020, R-3833. M-3833, and OPTOOL DAC (trade names) manufactured by DAIKIN INDUSTRIES, LTD, and MEGAFACE F-171 F-172. F-179A, RS-78, RS-90, and DEFENSA MCF-300 and MCF-323 (trade names) manufactured by DIC Corporation are preferable, but the fluorine-containing compound is not limited to these.

From the viewpoint of scratch resistance, in General Formula (F), the product of nf and mf (nf×mf) is preferably equal to or greater than 2, and more preferably equal to or greater than 4.

(Molecular Weight of Fluorine-Containing Compound)

The weight-average molecular weight (Mw) of the fluorine-containing compound having a polymerizable unsaturated group can be measured using molecular exclusion chromatography, for example, gel permeation chromatography (GPC).

Mw of the fluorine-containing compound used in the present invention is preferably equal to or greater than 400 and less than 50.000, more preferably equal to or greater than 400 and less than 30,000, and even more preferably equal to or greater than 400 and less than 25,000

(Amount of Fluorine-Containing Compound Added)

The amount of the fluorine-containing compound added with respect to the total mass of the anti-scratch layer is preferably 0.01% to 5% by mass, more preferably 0.1% to 5% by mass, even more preferably 0.5% to 5% by mass, and particularly preferably 0.5% to 2% by mass.

The film thickness of the anti-scratch layer is preferably 0.1 μm to 4 μm, more preferably 0.1 μm to 2 μm, and particularly preferably 0.1 μm to 1 μm.

The total thickness of the mixed layer and the anti-scratch layer is preferably 0.1 μm to 10 μm.

[Method for Manufacturing Hardcoat Film]

The method for manufacturing the hardcoat film according to the embodiment of the present invention is not particularly limited. As a preferred aspect, for example, a method may be used in which a substrate is coated with a composition for forming a hardcoat layer, the composition is semi-cured, a hardcoat layer formed by the semi-curing is coated with a composition for forming a mixed layer, and then the layers are fully cured (aspect A) In the aspect A, in a case where the hardcoat film according to the embodiment of the present invention additionally has an anti-scratch layer, it is preferable to coat the hardcoat layer with a composition for forming a mixed layer, semi-cure the composition, coat a mixed layer formed by the semi-curing with a composition for forming an anti-scratch layer, and then fully cure the respective layers.

In another preferred aspect, as means for forming a mixed layer in the hardcoat film, for example, a method may be adopted in which a hardcoat layer and an anti-scratch layer that are uncured or semi-cured are laminated on a substrate, interfacial mixing is caused at the interface between the hardcoat layer and the anti-scratch layer such that a mixed layer is formed, and then the respective layers are fully cured. For example, a method may be adopted in which an uncured hardcoat layer is formed on a substrate, an uncured anti-scratch layer is formed on a temporary support such that another laminate is prepared, the anti-scratch layer of the laminate is bonded to the hardcoat layer such that a mixed layer is formed by interfacial mixing occurring at the bonding surface, the respective layers are fully cured, and then the temporary support is removed (aspect B). In addition, for example, a method may be adopted in which a substrate is coated with a composition for forming a hardcoat layer and a composition for forming an anti-scratch layer such that multiple layers are formed, a mixed layer is formed at the interface between the layers, and then the respective layers are fully cured (aspect C). Furthermore, for example, a method may be adopted in which a substrate is coated with a composition for forming a hardcoat layer, the composition is semi-cured, a hardcoat layer formed by the semi-curing is coated with a composition for forming an anti-scratch layer, the composition is allowed to infiltrate into the hardcoat layer such that a mixed layer is formed, and then the respective layers are fully cured (aspect D).

Hereinafter, the aspects A and D will be specifically described.

(Aspect A)

Specifically, the aspect A is a manufacturing method including the following steps (I) to (IV).

(I) Step of coating a substrate with a composition for forming a hardcoat layer containing the aforementioned polyorganosilsesquioxane (a1) having an epoxy group so as to form a coating film (i)

(II) Step of performing a semi-curing treatment on the coating film (i)

(III) Step of coating the semi-cured coating film (i) with a composition for forming a mixed layer containing the epoxy compound (b1) and the polyfunctional (meth) acrylate compound (b2) so as to form a coating film (ii)

(IV) Step of performing a full curing treatment on the coating film (i) and the coating film (ii)

<Step (I)>

The step (I) is a step of coating a substrate with a composition for forming a hardcoat layer containing the polyorganosilsesquioxane (a1) having an epoxy group so as to form a coating film.

The substrate is as described above.

The composition for forming a hardcoat layer is a composition for forming the hardcoat layer described above.

The composition for forming a hardcoat layer is generally in the form of a liquid. Furthermore, the composition for forming a hardcoat layer is preferably prepared by dissolving or dispersing the polyorganosilsesquioxane (a1) and various optional additives and an optional polymerization initiator in an appropriate solvent. At this time, the concentration of solid contents is generally about 10% to 90% by mass, preferably 20% to 80% by mass, and particularly preferably about 40% to 70% by mass.

<Polymerization Initiator>

The polyorganosilsesquioxane (a1) contains a cationically polymerizable group (epoxy group). In order that the polymerization reaction of the polyorganosilsesquioxane (a1) is initiated by light irradiation, it is preferable that the composition for forming a hardcoat layer contains a cationic photopolymerization initiator. One kind of cationic photopolymerization initiator may be used singly, or two or more kinds of cationic photopolymerization initiators having different structures may be used in combination.

Hereinafter, the cationic photopolymerization initiator will be described.

(Cationic Photopolymerization Initiator)

As the cationic photopolymerization initiator, known cationic photopolymerization initiators can be used without particular limitation, as long as the initiators can generate cations as active species by light irradiation. Specific examples thereof include known sulfonium salts, ammonium salts, iodonium salts (for example, diaryliodonium salts), triarylsulfonium salts, diazonium salts, iminium salts, and the like. More specifically, examples thereof include the cationic photopolymerization initiators represented by Formulas (25) to (28) described in paragraphs "0050" to "0053" of JP1996-143806A (JP-1-H08-143806A), the compounds exemplified as cationic polymerization catalysts in paragraph "1020" of JP1996-283320A OP-H08-283320A), and the like. The cationic photopolymerization initiator can be synthesized by a known method or is available as a commercial product. Examples of the commercial product include CI-1370, CI-2064, CI-2397, CI-2624, CI-2639, CI-2734, CI-2758, CI-2823, CI-2855, CI-5102, and the like manufactured by NIPPON SODA CO., LTD., PHOTOINITIATOR 2047 and the like manufactured by Rhodia. UVI-6974 and UVI-6990 manufactured by Union Carbide Corporation, CPI-10P manufactured by San-Apro Ltd., and the like.

As the cationic photopolymerization initiator, in view of the sensitivity of the photopolymerization initiator with respect to light, the compound stability, and the like, a diazonium salt, an iodonium salt, a sulfonium salt, and an iminium salt are preferable. In view of weather fastness, an iodonium salt is most preferable.

Specific examples of commercial products of the iodonium salt-based cationic photopolymerization initiator include B2380 manufactured by TOKYO CHEMICAL INDUSTRY CO, LTD, BBI-102 manufactured by Midori Kagaku Co., Ltd, WPI-113, WPI-124, WPI-169, and WPI-170 manufactured by Wako Pure Chemical Industries, Ltd., and DTBPI-PFBS manufactured by Toyo Gosei Co., Ltd.

In addition, specific examples of the iodonium salt compound that can be used as the cationic photopolymerization initiator include the following compounds FK-1 and FK-2

Cationic Photopolymerization Initiator (Iodonium Salt Compound) FK-1

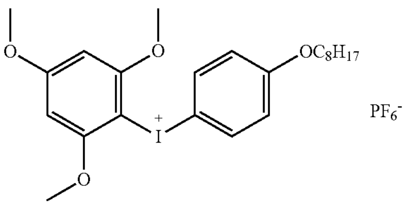

Cationic Photopolymerization Initiator (Iodonium Salt Compound) FK-2

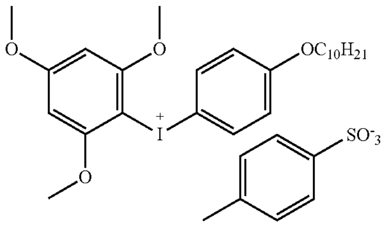

The content of the polymerization initiator in the composition for forming a hardcoat layer is not particularly limited and may be appropriately adjusted within a range in which the polymerization reaction (cationic polymerization) of the polyorganosilsesquioxane (a1) excellently proceeds. The content of the polymerization initiator with respect to 100 parts by mass of the polyorganosilsesquioxane (a1) is, for example, in a range of 0.1 to 200 parts by mass, preferably 1 to 20 parts by mass, and more preferably in a range of 1 to 5 parts by mass.

<Optional Components>

The composition for forming a hardcoat layer may further contain one or more kinds of optional components in addition to the polyorganosilsesquioxane (a1) and the polymerization initiator described above. Specific examples of the optional components include a solvent and various additives.

(Solvent)

As the solvent that can be contained as an optional component, an organic solvent is preferable. One kind of organic solvent can be used singly, or two or more kinds of organic solvents can be used by being mixed together at any ratio. Specific examples of the organic solvent include alcohols such as methanol, ethanol, propanol, n-butanol, and i-butanol; ketones such as acetone, methyl isobutyl ketone, methyl ethyl ketone, and cyclohexanone, cellosolves such as ethyl cellosolve; aromatic solvents such as toluene and xylene; glycol ethers such as propylene glycol monomethyl ether; acetic acid esters such as methyl acetate, ethyl acetate, and butyl acetate, diacetone alcohol; and the like. The amount of the solvent in the aforementioned composition can be appropriately adjusted within a range in which the coating suitability of the composition can be ensured. For example, the amount of the solvent with respect to the total amount (100 parts by mass) of the polyorganosilsesquioxane (a1) and the polymerization initiators can be 50 to 500 parts by mass, and preferably can be 80 to 200 parts by mass.

(Additives)

If necessary, the aforementioned composition can optionally contain one or more kinds of known additives. Examples of such additives include a dispersant, a leveling agent, an antifouling agent, an antistatic agent, an ultraviolet absorber, an antioxidant, and the like. For details of these, for example, paragraphs "0032" to "0034" of JP2012-229412A can be referred to. However, the additives are not limited to these, and it is possible to use various additives that can be generally used in a polymerizable composition. Furthermore, the amount of the additives added to the composition is not particularly limited and may be appropriately adjusted.

<Method of Preparing Composition>

The composition for forming a hardcoat layer used in the present invention can be prepared by simultaneously mixing together the various components described above or sequentially mixing together the various components described above in any order. The preparation method is not particularly limited, and the composition can be prepared using a known stirrer or the like.

As the method of coating a substrate with the composition for forming a hardcoat layer, known methods can be used without particular limitation. Examples thereof include a dip coating method, an air knife coating method, a curtain coating method, a roller coating method, a wire bar coating method, a gravure coating method, a die coating method, and the like.

<Step (II)>

The step (II) is a step of performing a semi-curing treatment on the coating film (i).

The type of ionizing radiation is not particularly limited, and examples thereof include X-rays, electron beams, ultraviolet, visible light, infrared, and the like. Among these, ultraviolet is preferably used. For example, in a case where the coating film can be cured by ultraviolet, it is preferable to irradiate the coating film with ultraviolet from an ultraviolet lamp at an irradiation dose of 2 $mJ/cm^2$ to 1,000 $mJ/cm^2$ such that the curable compound is cured. The irradiation dose is more preferably 2 $mJ/cm^2$ to 100 $mJ/cm^2$, and even more preferably 5 $mJ/cm^2$ to 50 $mJ/cm^2$. As the ultraviolet lamp, a metal halide lamp, a high-pressure mercury lamp, or the like is suitably used.

The oxygen concentration during curing is not particularly limited. In a case where the coating film contains a component (a compound having a (meth)acryloyl group) that is easily susceptible to curing inhibition, it is preferable to adjust the oxygen concentration to 0.1% to 2.0% by volume, because then the coating film can be in a semi-cured state where the functional groups remain on the surface. In addition, in a case where the coating film does not contain a component (a compound having a (meth)acryloyl group) that is easily susceptible to curing inhibition, it is preferable to replace the curing atmosphere with dry nitrogen, because then the influence exerted by the reaction between the epoxy group and the water vapor in the air can be removed.

If necessary, at either or both of a stage that follows the step (I) and precedes the step (II) and a stage that follows the step (II) and precedes the step (III), a drying treatment may be performed. The drying treatment can be performed by blowing hot air, disposing the film in a heating furnace, transporting the film in a heating furnace, and the like. The heating temperature is not particularly limited and may be set to a temperature at which the solvent can be dried and removed. The heating temperature means the temperature of hot air or the internal atmospheric temperature of the heating furnace.

By the semi-curing of the coating film (i) in the step (II), an unreacted epoxy group in the polyorganosilsesquioxane (a1) contained in the composition for forming a hardcoat layer and the epoxy compound contained in the composition for forming a mixed layer form a bond in the step (IV) which will be described later. Due to the formation of a bond described above, the hardcoat film according to the embodiment of the present invention has a laminated structure having high adhesiveness and thus can exhibit higher scratch resistance.

<Step (III)>

The step (III) is a step of coating the semi-cured coating film (i) with a composition for forming a mixed layer containing the epoxy compound (b1) and the polyfunctional (meth)acrylate compound (b2) so as to form a coating film (ii).

The composition for forming a mixed layer is a composition for forming the mixed layer described above.

The composition for forming a mixed layer is generally in the form of a liquid. Furthermore, the composition for forming a mixed layer is preferably prepared by dissolving or dispersing the aforementioned epoxy compound (b1), the polyfunctional (meth)acrylate compound (b2), various optional additives, and an optional polymerization initiator in an appropriate solvent. At this time, the concentration of solid contents is generally about 2% to 90% by mass, preferably 2% to 80% by mass, and particularly preferably about 2% to 70% by mass.

(Polymerization Initiator)

The composition for forming a mixed layer contains the epoxy compound (b1) (cationically polymerizable compound) and the polyfunctional (meth)acrylate compound (b2) (radically polymerizable compound). In order that the polymerization reactions of these polymerizable compounds polymerized in different ways are initiated by light irradiation, it is preferable that the composition for forming a mixed layer contains a radical photopolymerization initiator and a cationic photopolymerization initiator. One kind of radical photopolymerization initiator may be used singly, or two or more kinds of radical photopolymerization initiators having different structures may be used in combination. This point is also applied to the cationic photopolymerization initiator.

Hereinafter, each of the photopolymerization initiators will be described in order.

(Radical Photopolymerization Initiator)

As the radical photopolymerization initiator, known radical photopolymerization initiators can be used without particular limitation, as long as the initiators can generate radicals as active species by light irradiation. Specific examples thereof include acetophenones such as diethoxyacetophenone, 2-hydroxy-2-methyl-1-phenylpropan-1-one, benzyl dimethyl ketal, 4-(2-hydroxyethoxy)phenyl-(2-hydroxy-2-propyl)ketone, 1-hydroxycyclohexyl phenyl ketone, 2-methy-2-morpholino(4-thiomethylphenyl)propan-1-one, 2-benzyl-2-dimethylamino-1-(4-morpholinophenyl)-1-butanone, a 2-hydroxy-2-methyl-1-[4-(1-methylvinyl) phenyl]propane oligomer, and 2-hydroxy-1-{4-[4-(2-hydroxy-2-methyl-propionyl)-benzyl]phenyl}-2-methyl-propan-1-one; oxime esters such as 1,2-octanedione, 1-[4-(phenylthio)-2-(O-benzoyloxime)], ethanone, 1-[9-ethyl-6-(2-methylbenzoyl)-9H-carbazol-3-yl]-, 1-(0-acetyloxime); benzoins such as benzoin, benzoin methyl ether, benzoin ethyl ether, benzoin isopropyl ether, and benzoin isobutyl ether, benzophenones such as benzophenone, methyl o-benzoyl benzoate, 4-phenylbenzophenone, 4-benzoyl-4-methyl-diphenyl sulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzene methanaminium bromide, and (4-benzoylbenzyl)trimethyl ammonium chloride, thioxanthones such as 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-one methochloride; acylphosphine oxides such as 2,4,6-trimethylbenzoyl-diphenylphosphine oxide, bis(2,6-dimethoxybenzoyl)-2,4,4-trimethyl-pentylphosphine oxide, and bis(2,4,6-trimethylbenzoyl)-phenylphosphine oxide; and the like. Furthermore, as an aid for the radical photopolymerization initiator, triethanolamine, triisopropanolamine, 4,4'-dimethylaminobenzophenone (Michler's ketone), 4,4'-diethylaminobenzophenone, 2-dimethylaminoethyl benzoate, ethyl 4-dimethylaminobenzoate, (n-butoxy)ethyl 4-dimethylaminobenzoate, isoamyl 4-dimethylaminobenzoate, 2-ethylhexyl 4-dimethylaminobenzoate, 2,4-diethylthioxanthone, 2,4-diisopropylthioxanthone, and the like may be used in combination.

The above radical photopolymerization initiators and aids can be synthesized by a known method or are available as commercial products.

The content of the radical photopolymerization initiator in the composition for forming a mixed layer is not particularly limited and may be appropriately adjusted within a range in which the polymerization reaction (radical polymerization) of the radically polymerizable compound excellently proceeds. In the composition, the content of the radical photopolymerization initiator with respect to 100 parts by mass of the radically polymerizable compound is, for example, in a range of 0.1 to 20 parts by mass, preferably 0.5 to 10 parts by mass, and more preferably in a range of 1 to 10 parts by mass.

Examples of the cationic photopolymerization initiator include the cationic photopolymerization initiator that can be contained in the composition for forming a hardcoat layer described above.

The content of the cationic photopolymerization initiator in the composition for forming a mixed layer is not particularly limited and may be appropriately adjusted within a range in which the polymerization reaction (cationic polymerization) of the cationically polymerizable compound excellently proceeds. The content of the cationic photopolymerization initiator with respect to 100 parts by mass of the cationically polymerizable compound is, for example, in a range of 0.1 to 200 parts by mass, preferably 1 to 150 parts by mass, and more preferably in a range of 1 to 100 parts by mass.

<Optional Components>

The composition for forming a mixed layer may further contain one or more kinds of optional components in addition to the epoxy compound, the polyfunctional (meth) acrylate compound (b2), and the polymerization initiator described above. Specific examples of the optional components include solvents and various additives that can be used in the composition for forming a hardcoat layer.

<Method of Preparing Composition>

The composition for forming a mixed layer used in the present invention can be prepared by simultaneously mixing together the various components described above or sequentially mixing together the various components described above in any order. The preparation method is not particularly limited, and the composition can be prepared using a known stirrer or the like.

As the method of coating the coating film (i) with the composition for forming a mixed layer, known methods can be used without particular limitation.

<Step (IV)>

The step (IV) is a step of performing a full curing treatment on the coating film (i) and the coating film (ii).

It is preferable that the coating film is cured by radiating the ionizing radiation to the coating film side.

Regarding the type of the ionizing radiation, the ionizing radiation for curing the coating film (i) in the step (II) can be suitably used.

Regarding the irradiation dose of the ionizing radiation, for example, in a case where the coating film can be cured by ultraviolet, it is preferable to irradiate the coating film with ultraviolet from an ultraviolet lamp at an irradiation dose of 10 $mJ/cm^2$ to 6,000 $mJ/cm^2$ such that the curable compound is cured. The irradiation dose is more preferably 50 $mJ/cm^2$ to 6,000 $mJ/cm^2$, and even more preferably 10 $mJ/cm^2$ to 6,000 $mJ/cm^2$. Furthermore, in order to accelerate the curing of the coating film, it is also preferable that heating is performed in combination with the irradiation with ionizing radiation. The heating temperature is preferably equal to or higher than 40° C. and equal to or lower than 140° C., and more preferably equal to or higher than 60° C. and equal to or lower than 140° C. It is also preferable that the irradiation with ionizing radiation is performed multiple times.

The oxygen concentration during curing is preferably 0% to 10% by volume, more preferably 0% to 0.1% by volume, and most preferably 0% to 0.05% by volume. In a case where the oxygen concentration during curing is lower than 1.0% by volume, oxygen hardly affects and hinders curing, and thus a hard film is obtained.

If necessary, at either or both of a stage that follows the step (III) and precedes the step (IV) and a stage that follows the step (IV), a drying treatment may be performed.

It is also preferable that the method for manufacturing the hardcoat film includes a step of providing a layer, for example, an anti-scratch layer, other than the hardcoat layer and the mixed layer.

In a case where the anti-scratch layer is provided, it is preferable that the manufacturing method includes the following steps (IV') to (VI) after the steps (I) to (III).

(IV') Step of performing a semi-curing treatment on the coating film (ii) formed in the step (III)

(V) Step of coating the semi-cured coating film (ii) with a composition for forming an anti-scratch layer containing a polyfunctional (meth)acylate compound (c1) so as to form a coating film (iii)

(VI) Step of performing a full curing treatment on the coating film (i), the coating film (ii), and the coating film (iii)

<Step (IV')>

The step (IV') is a step of performing a semi-curing treatment on the coating film (ii) formed in the step (II).

It is preferable that the coating film is cured by radiating the ionizing radiation to the coating film side.

Regarding the type and irradiation dose of the ionizing radiation, the ionizing radiation for semi-curing the coating film (i) in the step (II) can be suitably used, and the irradiation dose of the ionizing radiation in the step (II) can be suitably used.

If necessary, at either or both of a stage that follows the step (III) and precedes the step (IV') and a stage that follows the step (IV') and precedes the step (V), a dying treatment may be performed.

By the semi-curing of the coating film (ii) in the step (IV'), the unreacted (meth)acryloyl group in the polyfunctional (meth)acrylate compound (b2) contained in the composition for forming a mixed layer and the (meth)acryloyl group in the polyfunctional (meth)acrylate compound (c1) contained in the composition for forming an anti-scratch layer form a bond in the step (VI) which will be described later Due to the formation of a bond described above, the hardcoat film according to the embodiment of the present invention has a laminated structure having high adhesiveness and thus can exhibit higher scratch resistance.

The oxygen concentration during curing is not particularly limited. It is preferable to adjust the oxygen concentration to 0.1% to 2.0% by volume. In a case where the oxygen concentration is set to be within the above range, the extent of the semi-curing can be adjusted.

<Step (V)>

The step (V) is a step of coating the semi-cured coating film (ii) with the composition for forming an anti-scratch layer containing the polyfunctional (meth)acrylate compound (c1) so as to form a coating film (iii).

The composition for forming an anti-scratch layer is a composition for forming the anti-scratch layer described above.

The composition for forming an anti-scratch layer is generally in the form of a liquid. Furthermore, the composition for forming an anti-scratch layer is preferably prepared by dissolving or dispersing the aforementioned polyfunctional (meth)acrylate compound (c1), various optional additives, and an optional polymerization initiator in an appropriate solvent. At this time, the concentration of solid contents is generally about 2% to 90% by mass, preferably 2% to 80% by mass, and particularly preferably about 2% to 70% by mass.

(Polymerization Initiator)

The composition for forming an anti-scratch layer contains the polyfunctional (meth)acrylate compound (c1) (radically polymerizable compound). In order that the polymerization reaction of the polyfunctional acrylate compound is initiated by light irradiation, it is preferable that the composition for forming an anti-scratch layer contains a radical photopolymerization initiator. One kind of radical photopolymerization initiator may be used singly, or two or more kinds of radical photopolymerization initiators having different structures may be used in combination. Examples of the radical photopolymerization initiator include the radical photopolymerization initiator that can be contained in the composition for forming a mixed layer described above.

The content of the radical photopolymerization initiator in the composition for forming an anti-scratch layer is not particularly limited and may be appropriately adjusted within a range in which the polymerization reaction (radical polymerization) of the radically polymerizable compound excellently proceeds. In the composition, the content of the radical photopolymerization initiator with respect to 100 parts by mass of the radically polymerizable compound is, for example, in a range of 0.1 to 20 parts by mass, preferably 0.5 to 10 parts by mass, and more preferably in a range of 1 to 10 parts by mass.

<Optional Components>

The composition for forming an anti-scratch layer may further contain one or more kinds of optional components in addition to the polyfunctional (meth)acrylate compound (c1) and the polymerization initiator. Specific examples of the optional components include the fluorine-containing compound described above and solvents and various additives that can be used in the composition for forming a hardcoat layer.

<Method of Preparing Composition>

The composition for forming an anti-scratch layer used in the present invention can be prepared by simultaneously mixing together the various components described above or sequentially mixing together the various components described above in any order. The preparation method is not particularly limited, and the composition can be prepared using a known stirrer or the like.

As the method of coating the coating film (ii) with the composition for forming an anti-scratch layer, known methods can be used without particular limitation.

<Step (VI)>

The step (VI) is a step of performing a full curing treatment on the coating film (i), the coating film (ii), and the coating film (iii).

It is preferable that the coating film is cured by radiating the ionizing radiation to the coating film side.

Regarding the type and irradiation dose of the ionizing radiation, the ionizing radiation for curing the coating film (i) and the coating film (ii) in the step (IV) can be suitably used, and the irradiation dose of the ionizing radiation in the step (IV) can be suitably used.

If necessary, at either or both of a stage that follows the step (V) and precedes the step (VI) and a stage that follows the step (VI), a drying treatment may be performed.

(Aspect D)

Specifically, the aspect D is a manufacturing method including the following steps (I) to (IV").

- (I) Step of coating a substrate with a composition for forming a hardcoat layer containing the aforementioned polymer and polyorganosilsesquioxane (a1) having an epoxy group so as to form a coating film (i)
- (II) Step of performing a semi-curing treatment on the coating film (i)
- (III') Step of coating the semi-cured coating film (i) with a composition for forming an anti-scratch layer containing a polyfunctional (meth)acrylate compound (c1) and allowing the composition to infiltrate into the coating film (i) so as to form a mixed layer (ii) and a coating film (iii)
- (IV") Step of performing a full curing treatment on the coating film (i), the mixed layer (ii) formed by infiltration, and the coating film (iii)

<Step (I)>

The step (I) is a step of coating a substrate with a composition for forming a hardcoat layer containing the aforementioned polymer and polyorganosilsesquioxane (a1) having an epoxy group so as to form a coating film (i). Details of the step (I) areas described above in the step (I) of the aspect A.

<Step (II)>

The step (II) is a step of performing a semi-curing treatment on the coating film (i) The curing conditions and the drying treatment in the step (II) are as described above in the step (II) of the aspect A.

In the aspect D, just as in the aspect A, it is preferable that the coating film (i) is semi-cured in the step (II). By the semi-curing of the coating film (i), the composition for forming an anti-scratch layer containing the polyfunctional (meth)acrylate compound (c1) easily infiltrates into the coating film (i) in the step (III'), and hence the mixed layer is easily formed. Due to the formation of the mixed layer by infiltration, the hardcoat film according to the embodiment of the present invention has a laminated structure having strong interlaminar adhesion and thus can exhibit higher scratch resistance.

<Step (III)>

The step (III') is a step of coating the semi-cured coating film (i) with a composition for forming an anti-scratch layer containing a polyfunctional (meth)acrylate compound (c1) and allowing the composition to infiltrate into the coating film (i) so as to form a mixed layer (ii) and a coating film (iii). The composition for forming an anti-scratch layer is a composition for forming the anti-scratch layer described above.

The polyfunctional (meth)acrylate compound (c1), solvent, and solid contents in the composition for forming an anti-scratch layer in the step (III') will be specifically described later because these are different from those in the aspect A. The polymerization initiator, optional components, and method for preparing the composition are as described above regarding the step (V) of the aspect A.

(Polyfunctional (meth)acrylate Compound (c1))

In the polyfunctional (meth)acrylate compound (c1) of the aspect D, the content of a polyfunctional (meth)acrylate compound having a molecular weight equal to or smaller than 400 is preferably equal to or higher than 20%. In a case where the content of the compound having a molecular weight equal to or smaller than 400 is equal to or higher than 20%, the composition for forming an anti-scratch layer easily infiltrates into the coating film, and hence a mixed layer is easily formed. The polyfunctional (meth)acrylate compound having a molecular weight equal to or smaller than 400 is not particularly limited. Specific examples thereof include KAYARAD PET-30 (manufactured by Nippon Kayaku Co., Ltd.), KAYARAD TMPTA (manufactured by Nippon Kayaku Co., Ltd.), pentaerythritol tetraacrylate (manufactured by SHIN-NAKAMURA CHEMICAL CO., LTD.), and the like.

(Solvent)

As the solvent in the aspect D, from the viewpoint of easily forming a mixed layer by allowing the polyfunctional (meth)acrylate compound (c1) to infiltrate into the coating film (i), it is preferable to use a solvent having high affinity with the hardcoat layer. The affinity between the solvent and the hardcoat layer can be determined from the increase in haze of the hardcoat layer that is caused in a case where the hardcoat layer is immersed in various solvents. That is, a solvent resulting in a larger increase in haze can be determined to have higher affinity with the hardcoat layer. Particularly, in a case where the hardcoat layer is polyorganosilsesquioxane containing an alicyclic epoxy group, as the solvent having high affinity with the hardcoat layer, methyl acetate, toluene, or methyl ethyl ketone is preferably used, and methyl acetate or toluene is more preferably used.

(Concentration of Solid Contents)

The solid contents of the composition for forming an anti-scratch layer in the aspect D can be appropriately adjusted by the composition for forming a hardcoat layer or the polyfunctional (meth)acrylate compound (c1). The concentration of solid contents of the composition for forming an anti-scratch layer is preferably equal to or lower than 40%, and more preferably equal to or lower than 20%. In a case where the concentration of solid contents is equal to or lower than 40%, the composition for forming an anti-scratch layer easily infiltrates into the hardcoat layer, and the mixed layer (ii) is easily formed. In a case where the concentration of solid contents is equal to or lower than 20%, the hardcoat film according to the embodiment of the present invention easily forms a laminated structure exhibiting strong interlaminar adhesion, and higher scratch resistance is easily obtained.

<Step (IV")>

The step (IV") is a step of performing a full curing treatment on the coating film (i), the mixed layer (ii) formed by infiltration, and the coating film (iii). The curing conditions and the drying treatment in the step (IV") are as described above in the step (IV) of the aspect A.

In the aspect D, if necessary, at either or both of a stage that follows the step (III') and precedes the step (IV") and a stage that follows the step (IV"), a drying treatment may be performed.

The present invention also relates to an article comprising the hardcoat film according to the embodiment of the present invention, and an image display device comprising the hardcoat film according to the embodiment of the present invention as a surface protection film. The hardcoat film according to the embodiment of the present invention is particularly preferably applied to flexible displays in smartphones and the like.

EXAMPLES

Hereinafter, the present invention will be more specifically described using examples, but the scope of the present invention is not limited thereto.

<Preparation of Substrate>

(Manufacturing of Polyimide Powder)

Under a nitrogen stream, 832 g of N,N-dimethylacetamide (DMAc) was added to a 1 L reactor equipped with a stirrer, a nitrogen injection device, a dropping funnel, a temperature controller, and a cooler, and then the temperature of the reactor was set to 25° C. Bistrifluoromethylbenzidine (TFDB) (64.046 g (0.2 mol)) was added thereto and dissolved. The obtained solution was kept at 25° C., and in this state, 31.09 g (0.07 mol) of 2,2-bis(3,4-dicarboxyphenyl)hexafluoropropane dianhydride (6FDA) and 8.83 g (0.03 mol) of biphenyltetracarboxylic dianhydride (BPDA) were added thereto, and the mixture was allowed to react by being stirred for a certain period of time. Then, 20.302 g (0.1 mol) of terephthaloyl chloride (TPC) was added thereto, thereby obtaining a polyamic acid solution with a concentration of solid contents of 13% by mass Thereafter, 25.6 g of pyridine and 33.1 g of acetic anhydride were added to the polyamic acid solution, and the mixture was stirred for 30 minutes, further stirred at 70° C. for 1 hour, and then cooled to room temperature. Methanol (20 L) was added thereto, and the precipitated solid contents were filtered and ground. Subsequently, the ground resultant was dried in a vacuum at 100° C. for 6 hours, thereby obtaining 111 g of polyimide powder.

(Preparation of Substrate S-1)

The polyimide powder (100 g) was dissolved in 670 g of N,N-dimethylacetamide (DMAc), thereby obtaining a 13% by mass solution. The obtained solution was cast on a stainless steel plate and dried with hot air at 130° C. for 30 minutes. Then, the film was peeled from the stainless steel plate and fixed to a frame by using pins, and the frame to which the film was fixed was put in a vacuum oven, heated for 2 hours by slowly increasing the heating temperature up to 300° C. from 100° C. and then slowly cooled. The cooled film was separated from the frame. Then, as a final heat treatment step, the film was further treated with heat for 30 minutes at 300° C., thereby obtaining a substrate S-1 having a film thickness of 30 μm consisting of a polyimide film.

(Preparation of Substrate S-2)

The compound represented by Formula (1), the compound represented by Formula (2), the compound represented by Formula (3), a catalyst, and a solvent (γ-butyrolactone and dimethylacetamide) were put in a polymerization tank having undergone nitrogen purging. The amount of the compound represented by Formula (1) put in the tank was 75.0 g. The amount of the compound represented by Formula (2) put in the tank was 36.5 g. The amount of the compound represented by Formula (3) put in the tank was 76.4 g. The amount of the catalyst put in the tank was 1.5 g. The amount of γ-butyrolactone put in the tank was 438.4 g. The amount of dimethylacetamide put in the tank was 313.1 g. The molar ratio of compound represented by Formula (2):compound represented by Formula (3) was 3:7. The molar ratio of total amount of compound represented by Formula (2) and compound represented by Formula (3):compound represented by Formula (1) was 1.00:1.02.

(1)

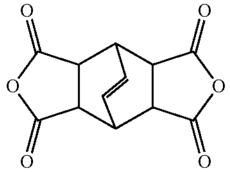

(2)

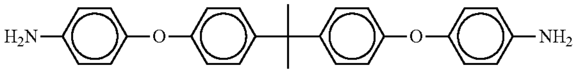

(3)

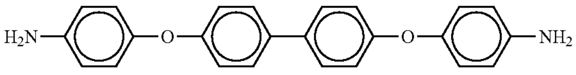

The mixture in the polymerization tank was stirred such that the raw materials were dissolved in the solvent Thereafter, the mixture was heated to 100° C. and then to 200° C., and kept at the same temperature for 4 hours such that polyimide was polymerized. While the mixture was being heated, water was removed from the solution. Then, by purification and drying, polyimide was obtained (a polyimide-based polymer containing a repeating structural unit represented by Formula (PI))

Subsequently, a γ-butyrolactone solution containing the polyimide with concentration adjusted to 20% by mass, a dispersion liquid obtained by dispersing silica particles in γ-butyrolactone at a concentration of solid contents of 30% by mass, a dimethylacetamide solution containing alkoxysilane having an amino group, and water were mixed together, and the mixture was stirred for 30 minutes. The mixture was stirred based on the method described in U.S. Pat. No. 8,207,256B2.

The mass ratio of silica particles polyimide was 60:40. The amount of the alkoxysilane having an amino group was 1.67 parts by mass with respect to a total of 100 parts by mass of the silica particles and polyimide. The amount of water was 10 parts by mass with respect to a total of 100 parts by mass of the silica particles and polyimide.

A glass substrate was coated with the mixed solution, and the mixed solution was dried by being heated at 50° C. for 30 minutes and 140° C. for 10 minutes. Then, the film was peeled from the glass substrate, and a metal frame was attached to the glass substrate and heated at 210° C. for 1 hour, thereby obtaining a substrate S-2 having a thickness of 80 μm. The content of the silica particles in this resin film was 60% by mass. The yellowness (YI value) of the obtained resin film was 2.3.

<Synthesis of Polyorganosilsesquioxane>

(Synthesis of Compound (A))

In a 1,000 ml flask (reaction vessel) equipped with a thermometer, a stirrer, a reflux condenser, and a nitrogen introduction pipe, 300 mmol (73.9 g) of 2-(3,4-epoxycyclohexyl)ethyltrimethoxysilane, 7.39 g of triethylamine, and 370 g of methyl isobutyl ketone (MIBK) were mixed together under a nitrogen stream, and 73.9 g of pure water was added dropwise thereto for 30 minutes by using a dropping funnel. The reaction solution was heated to 80° C. such that a polycondensation reaction was carried out under a nitrogen stream for 10 hours.

Thereafter, the reaction solution was cooled, 300 g of a 5% by mass saline was added thereto, and the organic layer was extracted. The organic layer was washed with 300 g of 5% by mass saline and washed twice with 300 g of pure water in this order, and then concentrated under the conditions of 1 mmHg and 50° C. thereby obtaining 87.0 g of a colorless and transparent liquid product {the compound (A) as polyorganosilsesquioxane having an alicyclic epoxy group (the compound represented by General Formula (1) in which Rb represents a 2-(3,4-epoxycyclohexyl)ethyl group, q=100, and r=0)} as an MIBK solution at a concentration of solid contents of 59.8% by mass.

As a result of analysis, the product has been found to have a number-average molecular weight of 2.050 and a molecular weight dispersity of 1.9.

Note that 1 mmHg equals about 133.322 Pa.

(Synthesis of Compound (B))

A methyl isobutyl ketone (MIBK) solution containing the compound (B) (the compound represented by General Formula (1) in which Rb represents a 3-glycidyloxypropyl group, q=100, and r=0) at a concentration of solid contents of 58.3% by mass was obtained in the same manner as in the synthesis of the compound (A), except that 2-(3,4-epoxycyclohexyl)ethyltrimethoxysilane in the synthesis of the compound (A) was changed to 3-glycidyloxypropyl trimethoxysilane.

The obtained compound (B) had a number-average molecular weight (Mn) of 2.190 and a dispersity (Mw/Mn) of 2.0.

(Synthesis of Compound (C))

A methyl isobutyl ketone (MIBK) solution containing the compound (C) (the compound represented by General Formula (1) in which Rb represents a 2-(3,4-epoxycyclohexyl) ethyl group, Rc represents a methyl group, q=99, and r=1) at a concentration of solid contents of 59.0% by mass was obtained in the same manner as in the synthesis of the compound (A), except that 300 mmol (73.9 g) of 2-(3,4-epoxycyclohexyl)ethyltrimethoxysilane in the synthesis of the compound (A) was changed to 297 mmol (73.2 g) of 2-(3,4-epoxy cyclohexyl)ethyltrimethoxysilane and 3 mmol (409 mg) of methyltrimethoxysilane.

The obtained compound (C) had a number-average molecular weight (Mn) of 2,310 and a dispersity (Mw/Mn) of 2.1.

Example 1

<Preparation of Composition for Forming Hardcoat Layer>

(Composition HC-1 for Forming Hardcoat Layer)

CPI-100P, a leveling agent-1, and methyl isobutyl ketone (MIBK) were added to the MIBK solution containing the compound (A), the concentration of each of the components was adjusted to the following concentration, and the mixture was put in a mixing tank and stirred. The obtained composition was filtered through a polpropylene filter having a pore size of 0.4 μm, thereby obtaining a composition HC-1 for forming a hardcoat layer.

Compound (A) 98.7 parts by mass

CPI-100P 1.3 parts by mass

Leveling agent-1 0.01 parts by mass

Methyl isobutyl ketone 100.0 parts by mass

The compounds used in the composition for forming a hardcoat layer are as follows.

CPI-100P: cationic photopolymerization initiator manufactured by San-Apro Ltd.

Leveling agent-1: polymer having the following structure (Mw=20,000, the compositional ratio of the following repeating units is a mass ratio)

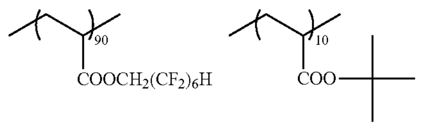

<Preparation of Composition for Forming Mixed Layer>

(Composition M-1 for Forming Mixed Layer)

The solvent of the MIBK solution containing the compound (A) was replaced with methyl ethyl ketone (MEK), DPHA, CPI-100P, IRGACURE 127, the leveling agent-1, and MEK were added thereto, the concentration of each of the components was adjusted to the following concentration, and the mixture was put in a mixing tank and stirred. The obtained composition was filtered through a polypropylene filter having a pore size of 0.4 μm, thereby obtaining a composition M-1 for forming a mixed layer. In the composition M-1 for forming a mixed layer, the mixing ratio between the compound (A) and DPHA is compound (A)/DPHA=20% by mass/80% by mass.

| | |
|---|---|
| Compound (A) | 17.14 parts by mass |
| DPHA | 68.56 parts by mass |
| CPI-100P | 1.3 parts by mass |
| IRGACURE 127 | 5.0 parts by mass |
| Leveling agent-1 | 8.0 parts by mass |
| Methyl ethyl ketone | 500.0 parts by mass |

The compounds used in the composition for forming a mixed layer are as follows.

DPHA: mixture of dipentaerythritol pentaacrylate and dipentaerythritol hexaacrylate, manufactured by Nippon Kayaku Co., Ltd.

IRGACURE 127: radical photopolymerization initiator, manufactured by BASF SE

<Preparation of Composition for Forming Anti-Scratch Layer>

(Composition SR-1 for Forming Anti-Scratch Layer)

Components composed as below were put in a mixing tank, stirred, and filtered through a polypropylene filter having a pore size of 0.4 μm, thereby obtaining a composition SR-1 for forming an anti-scratch layer.

| | |
|---|---|
| DPHA | 96.2 parts by mass |
| IRGACURE 127 | 2.8 parts by mass |
| RS-90 | 1.0 part by mass |
| Methyl ethyl ketone | 300.0 parts by mass |

(Composition SR-2 for forming anti-scratch layer)

Components composed as below were put in a mixing tank, stirred, and filtered through a polypropylene filter having a pore size of 0.4 μm, thereby obtaining a composition SR-2 for forming an anti-scratch layer.

| | |
|---|---|
| DPHA | 50.0 parts by mass |
| PET30 | 46.2 parts by mass |
| IRGACURE 127 | 2.8 parts by mass |
| RS-90 | 1.0 part by mass |
| Methyl acetate | 300.0 parts by mass |

(Composition SR-3 for forming anti-scratch layer)

Components composed as below were put in a mixing tank, stirred, and filtered through a polypropylene filter having a pore size of 0.4 μm, thereby obtaining a composition SR-3 for forming an anti-scratch layer.

| | |
|---|---|
| DPHA | 50.0 parts by mass |
| PET30 | 46.2 parts by mass |
| IRGACURE 127 | 2.8 parts by mass |
| RS-90 | 1.0 part by mass |
| Methyl ethyl ketone | 300.0 parts by mass |

(Composition SR-4 for forming anti-scratch layer)

Components composed as below were put in a mixing tank, stirred, and filtered through a polypropylene filter having a pore size of 0.4 μm, thereby obtaining a composition SR-4 for forming an anti-scratch layer.

| | |
|---|---|
| DPHA | 50.0 parts by mass |
| PET30 | 46.2 parts by mass |
| IRGACURE 127 | 2.8 parts by mass |
| RS-90 | 1.0 part by mass |
| Methyl ethyl ketone | 900.0 parts by mass |

(Composition SR-5 for forming anti-scratch layer)

Components composed as below were put in a mixing tank, stirred, and filtered through a polypropylene filter having a pore size of 0.4 μm, thereby obtaining a composition SR-5 for forming an anti-scratch layer.

| | |
|---|---|
| DPHA | 96.2 parts by mass |
| IRGACURE 127 | 2.8 parts by mass |
| RS-90 | 1.0 part by mass |
| Methyl ethyl ketone | 900.0 parts by mass |

The compounds used in the composition for forming an anti-scratch layer are as follows.

RS-90: slip agent, manufactured by DIC Corporation

PET30: mixture of pentaerythritol triacrylate and pentaerythritol tetraacrylate, manufactured by Nippon Kayaku Co., Ltd.

<Preparation of Hardcoat Film>

By using a die coater, the substrate S-1 was coated with the composition HC-1 for forming a hardcoat layer. After the composition HC-1 was dried at 120° C. for 1 minute, the hardcoat layer was semi-cured by being irradiated with ultraviolet at an illuminance of 18 mW/cm$^2$ and an irradiation dose of 10 mJ/cm$^2$ by using an air-cooled mercury lamp under the condition of 25° C.

By using a die coater, the semi-cured hardcoat layer was coated with the composition M-1 for forming a mixed layer After being dried at 120° C. for 1 minute, the composition M-1 was irradiated with ultraviolet at an illuminance of 60 mW/cm$^2$ and an irradiation dose of 600 mJ/cm$^2$ by using an air-cooled mercury lamp under the condition of 25° C. and an oxygen concentration of 100 parts per million (ppm) and then further irradiated with ultraviolet at an illuminance of 60 mW/cm and an irradiation dose of 600 mJ/cm$^2$ by using an air-cooled mercury lamp under the condition of 80° C. and an oxygen concentration of 100 ppm. In this way, the hardcoat layer and the mixed layer were fully cured. Then, the obtained film was treated with heat at 120° C. for 1 hour, thereby obtaining a hardcoat film 1 in which a mixed layer having a thickness of 1.0 μm is on a hardcoat layer having a thickness of 11.0 μm. By using a cross section cutting device ultramicrotome, a cross-sectional sample of the hardcoat film was prepared. The cross section was observed using SEM, and the thickness of each of the hardcoat layer and the mixed layer was calculated.

Examples 2 to 6

Hardcoat films 2 to 6 were obtained in the same manner as in Example 1, except that the mixing ratio between the compound (A) and DPHA in the composition M-1 for forming a mixed layer or the film thickness of the mixed layer was changed as shown in Table 1.

Example 71

A hardcoat layer was provided on a substrate in the same manner as in Example 1.

By adding MEK to the composition M-1 for forming a mixed layer, a diluted composition for forming a mixed layer was prepared which had a concentration of solid contents that was 1/10 of the concentration of solid contents of the composition M-1. By using a die coater, the semi-cured hardcoat layer was coated with this composition. After the composition was dried at 120'C for 1 minute, the mixed layer was semi-cured by being irradiated with ultraviolet at an illuminance of 18 mW/cm$^2$ and an irradiation dose of 10 mJ/cm$^2$ by using an air-cooled mercury lamp under the condition of 25° C. and an oxygen concentration of 1%. In this way, a mixed layer was provided on the hardcoat layer.

By using a die coater, the semi-cured mixed layer was coated with the composition SR-1 for forming an anti-scratch layer. After being dried at 120° C. for 1 minute, the composition S-1 was irradiated with ultraviolet at an illuminance of 60 mW/cm$^2$ and an irradiation dose of 600 mJ/cm$^2$ by using an air-cooled mercury lamp under the condition of 25° C. and an oxygen concentration of 100 ppm and then further irradiated with ultraviolet at an illuminance of 60 mW/cm$^2$ and an irradiation dose of 600 mJ/cm$^2$ by using an air-cooled mercury lamp under the condition of 80° C. and an oxygen concentration of 100 ppm. In this way, the hardcoat layer, the mixed layer, and the anti-scratch layer were fully cured. Then, the obtained film was treated with heat at 120° C. for 1 hour, thereby obtaining a hardcoat film 7 in which an anti-scratch layer having a thickness of 1.0 μm is on a mixed layer having a thickness of 0.1 μm. By using a cross section cutting device ultramicrotome, a cross-sectional sample of the hardcoat film was prepared. The cross section was observed using SEM, and the thickness of each of the hardcoat layer, the mixed layer, and the anti-scratch layer was calculated.

Examples 8 to 251

Hardcoat films 8 to 25 were obtained in the same manner as in Example 7, except that the type of substrate, the type of epoxy compound and polyfunctional acrylate compound in the composition for forming a mixed layer, the mixing ratio between the epoxy compound and the polyfunctional acrylate compound, the type of polyorganosilsesquioxane in the composition for forming a hardcoat layer, and the mixing ratio of the polyfunctional acrylate compound were changed to the type and mixing ratio described in Table 1, and the film thickness of each layer was changed to the thickness described in Table 1.

CEL2021P: the following compound, manufactured by Daicel Corporation

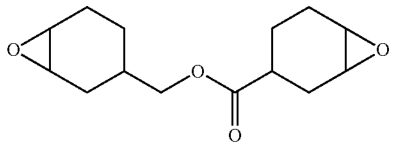

CEL2021P

DPCA20: KAYARAD DPCA20, the following compound manufactured by Nippon Kayaku Co, Ltd.

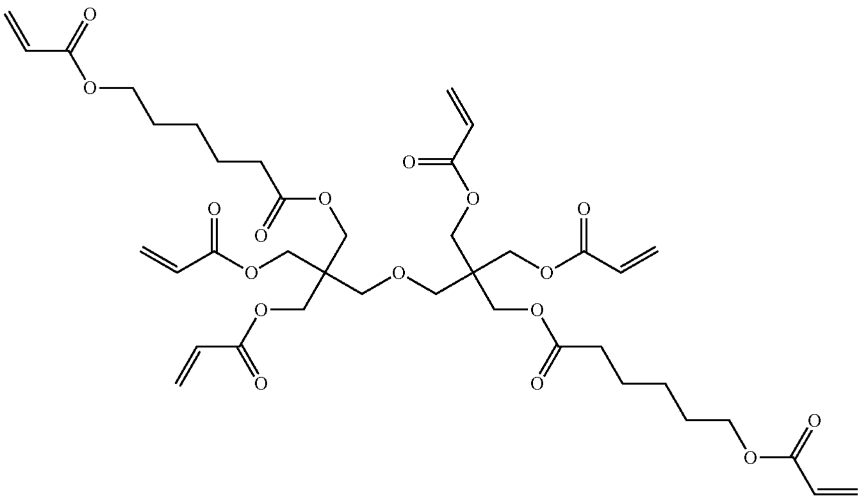 [SMILES: C=CC(=O)OCCCCCC(=O)OCC(COCC(COC(=O)C=C)(COC(=O)C=C)COC(=O)CCCCCOC(=O)C=C)(COC(=O)C=C)COC(=O)C=C]

Example 26

<Preparation of Hardcoat Film>

By using a die coater, the substrate S-1 was coated with the composition HC-1 for forming a hardcoat layer. After the composition HC-1 was dried at 120° C. for 1 minute, the hardcoat layer was semi-cured by being irradiated with ultraviolet at an illuminance of IS mW/$cm^2$ and an irradiation dose of 10 mJ/$cm^2$ by using an air-cooled mercury lamp under the condition of 25° C.

By using a die coater, the semi-cured hardcoat layer was coated with the composition SR-2 for forming an anti-scratch layer. After being dried at 120° C. for 1 minute, the composition SR-2 was irradiated with ultraviolet at an illuminance of 60 mW/$cm^2$ and an irradiation dose of 600 mJ/$cm^2$ by using an air-cooled mercury lamp wider the condition of 25° C. and an oxygen concentration of 100 ppm and then further irradiated with ultraviolet at an illuminance of 60 mW/$cm^2$ and an irradiation dose of 600 mJ/$cm^2$ by using an air-cooled mercury lamp under the condition of 80° C. and an oxygen concentration of 100 ppm. In this way, the hardcoat layer, the mixed layer formed by infiltration, and the anti-scratch layer were fully cured. Then, the obtained film was treated with heat at 120° C. for 1 hour, thereby obtaining a hardcoat film 26 including an anti-scratch layer having a thickness of 1.0 μm.

Examples 27 to 29

Hardcoat films 27 to 29 were obtained in the same manner as in Example 26, except that the composition for forming an anti-scratch layer was changed to the composition described in Table 1.

Comparative Example 1

By using a die coater, the substrate S-1 was coated with the composition HC-1 for forming a hardcoat layer. After being dried at 120° C. for 1 minute, the composition HC-1 was irradiated with ultraviolet at an illuminance of 60 mW/$cm^2$ and an irradiation dose of 600 mJ/$cm^2$ by using an air-cooled mercury lamp under the condition of 25'C and an oxygen concentration of 100 ppm and then further irradiated with ultraviolet at an illuminance of 60 mW/$cm^2$ and an irradiation dose of 600 mJ/$cm^2$ by using an air-cooled mercury lamp under the condition of 80° C. and an oxygen concentration of 100 ppm. In this way, the hardcoat layer was fully cured. Then, the obtained film was treated with heat at 120° C. for 1 hour, thereby obtaining a comparative hardcoat film t in which a hardcoat layer having a thickness of 11.0 μm was on a substrate.

Comparative Examples 2 to 4

Comparative hardcoat films 2 to 4 were obtained in the same manner as in Comparative Example 1, except that the compound (A) in the composition HC-1 for forming a hardcoat layer was replaced with a mixture obtained by mixing the compound (A) with DPHA at the ratio shown in Table 1.

Comparative Example 5

A comparative hardcoat film 5 was obtained in the same manner as in Example 7, except that the coating with the composition M-1 for forming a mixed layer and the semi-curing of the mixed layer were not performed.

<Condensation Rate>

The condensation rate of the hardcoat films obtained in Examples 1 to 24 was calculated using the results of $^{29}$Si NMR spectroscopy. Specifically, from the results of $^{29}$Si NMR spectroscopy (spectrometer: AVANCE400 manufactured by Bruker Biospin, solvent. $CDCl_3$), the area ratios of T3, T2, T1, and T0 were determined, and the condensation rate was calculated using the following equation. In the results of $^{29}$Si NMR spectroscopy, T3 is a peak resulting from a structure in which all three hydrolyzable groups bonded to Si are condensed, T2 is a peak resulting from a structure in which two hydrolyzable groups bonded to Si are condensed, T1 is a peak resulting from a structure in which one hydrolyzable group bonded to Si is condensed, and T0 is a peak derived from a structure in which the hydrolyzable group bonded to Si is not condensed.

$$\text{Condensation rate (\%)}=(0*T0+1*T1+2*T2+3*T3)/(3(T0+T1+T2+T3))\times100$$

The condensation rate of the hardcoat films obtained in Examples 1 to 24 was 96%.

<Surface Ring Opening Rate>

By FT-R single reflection ATR analysis, the height of a peak (883 $cm^{-1}$ for the compounds (A) and (C) having an alicyclic epoxy group and 910 cm for the compound (B) having a glycidyl ether group) resulting from an epoxy group was measured for each of the uncured product and cured product, and the surface ring opening rate of the polyorganosilsesquioxane contained in the hardcoat layer was calculated by the following equation.

$$\text{Surface ring opening rate (\%)}=(1-\text{peak height after curing}/\text{peak height before curing})\times100$$

The substrate was coated with the composition for forming a hardcoat layer containing polyorganosilsesquioxane used in Examples 1 to 24 such that the film thickness described in Table 1 was obtained, and the composition was dried, thereby preparing films (uncured products). A mixed layer or an anti-scratch layer was not provided on the uncured products, and the uncured products were subjected to a full curing treatment and a heat treatment, thereby preparing films (cured products).

The full curing treatment is a process of irradiating the film with ultraviolet at an illuminance of 60 $mW/cm^2$ and an irradiation dose of 600 $mJ/cm^2$ by using an air-cooled mercury lamp under the condition of 25° C. and an oxygen concentration of 100 ppm and then further irradiating the film with ultraviolet at an illuminance of 60 $mW/cm^2$ and an irradiation dose of 600 $mJ/cm^2$ by using an air-cooled mercury lamp tinder the condition of 80° C. and an oxygen concentration of 100 ppm. The heat treatment is a process of treating the fully cured film at 120° C. for 1 hour.

The surface ring opening rate of the compounds (A) and (C) in the hardcoat layer calculated from the results of FT-IR single reflection ATR analysis on the above sample was 70%. The surface ring opening rate of the compound (B) was 67%.

<Analysis of Thickness of Mixed Layer Formed by Infiltration>

While the hardcoat films obtained in Examples 26 to 29 were being etched from the anti-scratch layer side by using an Ar-GCIB gun (15 kV, 2.5 nA, 500 μm×500 μm), fragment ions were analyzed using a mass spectrometer "TRIFT V Nano TOF (primary ion: $Bi_3^{++}$, accelerating voltage: 30 kV)" manufactured by ULVAC-PHI, INCORPORATED, and in this way, the thickness of the mixed layer of the hardcoat films was determined. A region in which both the fragment derived from the component of the anti-scratch layer and the fragment ions derived from the component of the hardcoat layer were detected was regarded as a mixed layer. The thickness of the mixed layer was calculated from the time when the mixed layer was detected and the etching depth of the anti-scratch layer per unit time that was determined in advance. The thicknesses of the mixed layers of the hardcoat films obtained in Examples 26 to 29 were 0.15 μm, 0.08 μm, 0.12 μm, and 0.10 μm, respectively.

[Evaluation of Hardcoat Film]

The prepared hardcoat films were evaluated by the following methods.

(Pencil Hardness)

The pencil hardness was measured based on JIS K 5600-5-4 (1999).

(Resistance to Repeated Folding)

A sample film having a width of 15 mm and a length of 150 mm was cut out from the hardcoat film manufactured in each of the examples and comparative examples, and left stand for 1 hour or longer at a temperature of 25° C. and a relative humidity of 65%. Then, by using a folding endurance tester (manufactured by IMOTO MACHINERY CO., LTD., IMC-0755, a radius of curvature for folding: 1.0 mm), the sample with the substrate facing outward was tested for resistance to repeated folding. Based on the number of times the sample was folded until the sample cracked or was broken, the resistance to repeated folding was evaluated.

A: Equal to or greater than 500,000

B: Equal to or greater than 100,000 and less than 500,000

C: Less than 100,000

(Scratch Resistance)

By using a rubbing tester, under the following conditions, a rubbing test was performed on a surface of the hardcoat film manufactured by each of the examples and comparative examples that was opposite to the other surface thereof coming into contact with the substrate, thereby obtaining indices of scratch resistance.

Environmental conditions for evaluation: 25° C., relative humidity 60%

Rubbing Material: steel wool (NIHON STEEL WOOL Co, Ltd., grade No. 0000)

The steel wool was wound around the rubbing tip portion (1 cm×1 cm) of the tester coming into contact with the sample and fixed with a band.

Moving distance (one way): 13 cm

Rubbing speed: 13 cm/sec

Load: 1,000 $g/cm^2$

Contact area of tip portion: 1 cm×1 cm.

Number of times of rubbing: rubbed back and forth 100 times, 1,000 times, and 5,000 times After the test, an oil-based black ink was applied to the surface, which was opposite to the rubbed surface, of the hardcoat film of each of the examples and the comparative examples. The reflected light was visually observed, the number of times of rubbing that caused scratches in the portion contacting the steel wool was counted, and the scratch resistance was evaluated based on the following four standards.

A: No scratch was made even after the hardcoat film was rubbed 5,000 times.

B: No scratch was made even after the hardcoat film was rubbed 1,000 times, but before the hardcoat film was rubbed 5,000 times, scratches were made.

C: No scratch was made even after the hardcoat film was rubbed 100 times, but before the hardcoat film was rubbed 1,000 times, scratches were made.

D: Scratches were made before the hardcoat film was rubbed 100 times.

The evaluation results are shown in the following Table 1.

TABLE 1

| | | Hardcoat layer | | | | | Mixed layer | | | | |
|---|---|---|---|---|---|---|---|---|---|---|---|
| | Substrate | Polyorganosilsesquioxane | Mixing amount (% by mass) | Polyfunctional (meth)acrylate compound | Mixing amount (% by mass) | Film thickness [μm] | Epoxy compound | Mixing amount (% by mass) | Polyfunctional (meth)acrylate compound | Mixing amount (% by mass) | Film thickness [μm] |
| Example 1 | S-1 | Compound (A) | 100 | — | — | 11.0 | Compound (A) | 20 | DPHA | 80 | 1.0 |
| Example 2 | S-1 | Compound (A) | 100 | — | — | 11.0 | Compound (A) | 50 | DPHA | 50 | 1.0 |
| Example 3 | S-1 | Compound (A) | 100 | — | — | 11.0 | Compound (A) | 80 | DPHA | 20 | 1.0 |
| Example 4 | S-1 | Compound (A) | 100 | — | — | 11.0 | Compound (A) | 20 | DPHA | 80 | 0.1 |
| Example 5 | S-1 | Compound (A) | 100 | — | — | 11.0 | Compound (A) | 20 | DPHA | 80 | 5.0 |
| Example 6 | S-1 | Compound (A) | 100 | — | — | 11.0 | Compound (A) | 20 | DPHA | 80 | 10.0 |
| Example 7 | S-1 | Compound (A) | 100 | — | — | 11.0 | Compound (A) | 20 | DPHA | 80 | 0.1 |
| Example 8 | S-1 | Compound (A) | 100 | — | — | 11.0 | Compound (A) | 50 | DPHA | 50 | 0.1 |
| Example 9 | S-1 | Compound (A) | 100 | — | — | 11.0 | Compound (A) | 80 | DPHA | 20 | 0.1 |
| Example 10 | S-1 | Compound (A) | 100 | — | — | 11.0 | Compound (A) | 50 | DPHA | 50 | 0.1 |
| Example 11 | S-1 | Compound (A) | 100 | — | — | 11.0 | Compound (A) | 50 | DPHA | 50 | 0.1 |
| Example 12 | S-1 | Compound (A) | 100 | — | — | 11.0 | Compound (A) | 50 | DPHA | 50 | 0.1 |
| Example 13 | S-1 | Compound (A) | 100 | — | — | 17.0 | Compound (A) | 50 | DPHA | 50 | 0.1 |
| Example 14 | S-1 | Compound (A) | 100 | — | — | 5.0 | Compound (A) | 50 | DPHA | 50 | 0.1 |
| Example 15 | S-1 | Compound (B) | 100 | — | — | 16.0 | Compound (A) | 50 | DPHA | 50 | 0.1 |
| Example 16 | S-1 | Compound (C) | 100 | — | — | 11.0 | Compound (A) | 50 | DPHA | 50 | 0.1 |
| Example 17 | S-1 | Compound (A) | 100 | — | — | 11.0 | CEL2021P | 50 | DPHA | 50 | 0.1 |
| Example 18 | S-1 | Compound (A) | 100 | — | — | 11.0 | Compound (B) | 50 | DPHA | 50 | 0.1 |
| Example 19 | S-1 | Compound (A) | 100 | — | — | 11.0 | Compound (A) | 50 | DPCA20 | 50 | 0.1 |
| Example 20 | S-1 | Compound (A) | 100 | — | — | 11.0 | Compound (A) | 50 | DPHA | 50 | 1.0 |

TABLE 1-continued

| | | | | | | | | | | | |
|---|---|---|---|---|---|---|---|---|---|---|---|
| Example 21 | S-1 | Compound (A) | 100 | — | — | 11.0 | Compound (A) | 50 | DPHA | 50 | 2.0 |
| Example 22 | S-1 | Compound (A) | 100 | — | — | 11.0 | Compound (A) | 50 | DPHA | 50 | 4.0 |
| Example 23 | S-1 | Compound (A) | 100 | — | — | 11.0 | Compound (A) | 50 | DPHA | 50 | 9.0 |
| Example 24 | S-1 | Compound (A) | 95 | DPHA | 5 | 11.0 | Compound (A) | 50 | DPHA | 50 | 0.1 |
| Comparative Example 1 | S-1 | Compound (A) | 100 | — | — | 11.0 | — | — | — | — | — |
| Comparative Example 2 | S-1 | Compound (A) | 50 | DPHA | 50 | 11.0 | — | — | — | — | — |
| Comparative Example 3 | S-1 | Compound (A) | 80 | DPHA | 20 | 11.0 | — | — | — | — | — |
| Comparative Example 4 | S-1 | Compound (A) | 95 | DPHA | 5 | 11.0 | — | — | — | — | — |
| Comparative Example 5 | S-1 | Compound (A) | 100 | — | — | 11.0 | — | — | — | — | — |
| Example 25 | S-1 | Compound (A) | 100 | — | — | 15.0 | Compound (A) | 50 | DPHA | 50 | 0.1 |
| Example 26 | S-1 | Compound (A) | 100 | — | — | 11.0 | Compound (A) | — | DPHA, PET30 | — | 0.15 |
| Example 27 | S-1 | Compound (A) | 100 | — | — | 11.0 | Compound (A) | — | DPHA, PET30 | — | 0.08 |
| Example 28 | S-1 | Compound (A) | 100 | — | — | 11.0 | Compound (A) | — | DPHA, PET30 | — | 0.12 |
| Example 29 | S-1 | Compound (A) | 100 | — | — | 11.0 | Compound (A) | — | DPHA | — | 0.10 |

| | Anti-scratch layer | | | | Evaluation | | |
|---|---|---|---|---|---|---|---|
| | Polymerizable compound | Composition for forming anti-scratch layer | Concentration of solid contents | Film thickness [μm] | Pencil hardness | Scratch resistance | Resistance to repeated folding |
| Example 1 | — | — | — | — | 6H | B | A |
| Example 2 | — | — | — | — | 7H | C | A |
| Example 3 | — | — | — | — | 8H | C | A |
| Example 4 | — | — | — | — | 8H | C | A |
| Example 5 | — | — | — | — | 6H | B | B |
| Example 6 | — | — | — | — | 5H | B | B |
| Example 7 | DPHA, RS-90 | SR-1 | 25% | 1.0 | 8H | A | A |
| Example 8 | DPHA, RS-90 | SR-1 | 25% | 1.0 | 8H | A | A |
| Example 9 | DPHA, RS-90 | SR-1 | 25% | 1.0 | 8H | A | A |
| Example 10 | DPHA, RS-90 | SR-1 | 25% | 0.1 | 8H | B | A |
| Example 11 | DPHA, RS-90 | SR-1 | 25% | 2.0 | 8H | A | B |

TABLE 1-continued

| | | | | | | | |
|---|---|---|---|---|---|---|---|
| Example 12 | DPHA, RS-90 | SR-1 | 25% | 4.0 | 6H | A | B |
| Example 13 | DPHA, RS-90 | SR-1 | 25% | 1.0 | 8H | A | B |
| Example 14 | DPHA, RS-90 | SR-1 | 25% | 1.0 | 5H | A | A |
| Example 15 | DPHA, RS-90 | SR-1 | 25% | 1.0 | 5H | B | B |
| Example 16 | DPHA, RS-90 | SR-1 | 25% | 1.0 | 8H | A | A |
| Example 17 | DPHA, RS-90 | SR-1 | 25% | 1.0 | 7H | B | A |
| Example 18 | DPHA, RS-90 | SR-1 | 25% | 1.0 | 7H | B | A |
| Example 19 | DPHA, RS-90 | SR-1 | 25% | 1.0 | 7H | B | A |
| Example 20 | DPHA, RS-90 | SR-1 | 25% | 1.0 | 8H | A | B |
| Example 21 | DPHA, RS-90 | SR-1 | 25% | 1.0 | 7H | A | B |
| Example 22 | DPHA, RS-90 | SR-1 | 25% | 1.0 | 6H | A | B |
| Example 23 | DPHA, RS-90 | SR-1 | 25% | 1.0 | 5H | A | B |
| Example 24 | DPHA, RS-90 | SR-1 | 25% | 1.0 | 6H | A | A |
| Comparative Example 1 | — | | | — | 8H | D | A |
| Comparative Example 2 | — | | | — | 4H | C | C |
| Comparative Example 3 | — | | | — | 4H | C | B |
| Comparative Example 4 | — | | | — | 5H | D | A |
| Comparative Example 5 | DPHA, RS-90 | SR-1 | 25% | 1.0 | 8H | D | A |
| Example 25 | DPHA, RS-90 | SR-1 | 25% | 1.0 | 6H | A | B |
| Example 26 | DPHA, PET30 RS-90 | SR-2 | 25% | 1.0 | 8H | A | A |
| Example 27 | DPHA, PET30 RS-90 | SR-3 | 25% | 1.0 | 8H | C | A |
| Example 28 | DPHA, PET30 RS-90 | SR-4 | 10% | 1.0 | 8H | B | A |
| Example 29 | DPHA, RS-90 | SR-5 | 10% | 1.0 | 8H | C | A |

As shown in Table 1, the hardcoat films of examples were excellent in all of the hardness, scratch resistance, and resistance to repeated folding. On the other hand, the hardcoat films of Comparative Examples 1, 4, and 5 had poor scratch resistance because they did not have a mixed layer. Furthermore, compared to the hardcoat films of Comparative Examples 2 and 3, the hardcoat films of Comparative Examples 1, 4, and 5 in which the amount of the polyfunctional acylate compound mixed with the hardcoat layer was smaller than Comparative Examples 2 and 3 had higher hardness.

What is claimed is:

1. A hardcoat film comprising:

a substrate;

a hardcoat layer;

a mixed layer; and an anti-scratch layer in this order, wherein:

the hardcoat layer contains a cured product of polyorganosilsesquioxane (a1) having an epoxy group, the mixed layer contains a cured product of a compound (b1) having an epoxy group and a cured product of a compound (b2) having two or more (meth)acryloyl groups in one molecule, the anti-scratch layer contains a cured product of a compound (c1) having two or more (meth)acryloyl groups in one molecule, the polyorganosilsesquioxane (a1) having an epoxy group and the compound (b1) having an epoxy group are the same compound, the compound (b2) having two or more (meth)acryloyl groups in one molecule and the compound (c1) having two or more (meth)acryloyl groups in one molecule are a same compound prior to fully curing of the hardcoat film, and the hardcoat layer and the mixed layer are bonded to each other by a covalent bond.

2. The hardcoat film according to claim 1, wherein a thickness of the mixed layer is 0.05 μm to 10 μm.

3. The hardcoat film according to claim 1, wherein a total thickness of the mixed layer and the anti-scratch layer is 0.1 μm to 10 μm.

4. The hardcoat film according to claim 1, wherein in the mixed layer, a content rate of the cured product of the compound (b2) having two or more (meth)acryloyl groups in one molecule is equal to or higher than 10% by mass with respect to a total amount of the cured product of the compound (b1) having an epoxy group and the cured product of the compound (b2) having two or more (meth)acryloyl groups in one molecule.

5. The hardcoat film according to claim 1, wherein the hardcoat layer does not contain a cured product of a compound having a (meth)acryloyl group, or a content rate of the cured product of a compound having a (meth)acryloyl group is less than 10% by mass with respect to a total amount of the cured product of the polyorganosilsesquioxane (a1) having an epoxy group and the cured product of the compound having a (meth)acryloyl group.

6. The hardcoat film according to claim 1, wherein the substrate contains an imide-based polymer.

7. An article comprising:

the hardcoat film according to claim 1.

8. An image display device comprising:

the hardcoat film according to claim 1 as a surface protection film.

9. The hardcoat film according to claim 1, wherein the epoxy group of the polyorganosilsesquioxane (a1) in the hardcoat layer and the epoxy group of the epoxy compound (b1) in the mixed layer form a covalent bond at an interface between the hardcoat layer and the mixed layer.

10. The hardcoat film according to claim 1, wherein the mixed layer is bonded to both the hardcoat layer and the anti-scratch layer with covalent bonds.

11. The hardcoat film according to claim 1, wherein the cured product of (b1) and the cured product of (b2) are interlaced with each other in the hardcoat film.

12. The hardcoat film according to claim 1, wherein the mixed layer comprises an infiltration of the anti-scratch layer into the hardcoat layer prior to fully curing the hardcoat film, such that the polyorganosilsesquioxane (a1) having an epoxy group and the compound (b1) having an epoxy group are a same compound prior to fully curing of the hardcoat film.

* * * * *